(12) United States Patent
Yatsunami et al.

(10) Patent No.: US 10,654,433 B2
(45) Date of Patent: May 19, 2020

(54) IMPACT ABSORBING DEVICE AND BUMPER REINFORCEMENT

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Hiroyuki Yatsunami, Anjo (JP); Kiyoichi Kita, Okazaki (JP); Jun Shobo, Anjo (JP); Yohei Kanatani, Imizu (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 82 days.

(21) Appl. No.: 16/009,464

(22) Filed: Jun. 15, 2018

(65) Prior Publication Data

US 2018/0361968 A1    Dec. 20, 2018

(30) Foreign Application Priority Data

Jun. 20, 2017  (JP) .................. 2017-120405

(51) Int. Cl.
*B60R 19/34* (2006.01)
*B60R 19/02* (2006.01)
*B60R 19/18* (2006.01)

(52) U.S. Cl.
CPC ............ *B60R 19/34* (2013.01); *B60R 19/023* (2013.01); *B60R 19/18* (2013.01); *B60R 2019/182* (2013.01)

(58) Field of Classification Search
CPC ....... B60R 19/34; B60R 19/023; B60R 19/18; B60R 2019/182
See application file for complete search history.

(56) References Cited

U.S. PATENT DOCUMENTS

| 8,505,990 | B2 * | 8/2013 | Czopek ................. B60R 19/18 293/102 |
| 9,371,047 | B2 | 6/2016 | Hashimoto et al. |
| 9,399,437 | B2 | 7/2016 | Hashimoto et al. |

FOREIGN PATENT DOCUMENTS

| EP | 1241080 A2 * | 9/2002 | ............ B60R 19/12 |
| EP | 1369308 A1 * | 12/2003 | ............ B60R 19/18 |
| JP | 2009035027 A * | 2/2009 | |
| JP | 2012-153252 | 8/2012 | |
| JP | 5486251 B2 * | 5/2014 | |
| JP | 2015-51754 | 3/2015 | |

(Continued)

*Primary Examiner* — Lori L Lyjak
(74) *Attorney, Agent, or Firm* — Finnegan, Henderson, Farabow, Garrett & Dunner, LLP

(57) ABSTRACT

An impact absorbing device includes an impact absorbing member extending in a vehicle front-rear direction; and a bumper reinforcement that extends in a vehicle width direction and is attached to a front end surface of the impact absorbing member. The bumper reinforcement includes a body portion extending in the vehicle width direction and having a length in a vehicle height direction that is smaller than a length of the impact absorbing member in the vehicle height direction, and a reinforcing portion fixed to the body portion and extending along a portion of the front end surface of the impact absorbing member, the portion being positioned above or below the body portion.

8 Claims, 19 Drawing Sheets

(56) References Cited

FOREIGN PATENT DOCUMENTS

| | | | |
|---|---|---|---|
| JP | 2015-168299 | | 9/2015 |
| JP | 5968285 | | 8/2016 |
| JP | 6008811 | | 10/2016 |
| JP | 2017-17511 | | 1/2017 |
| KR | 20110072901 A | * | 6/2011 |
| KR | 20150076565 A | * | 7/2015 |
| WO | WO-2015137547 A1 | * | 9/2015 |

* cited by examiner

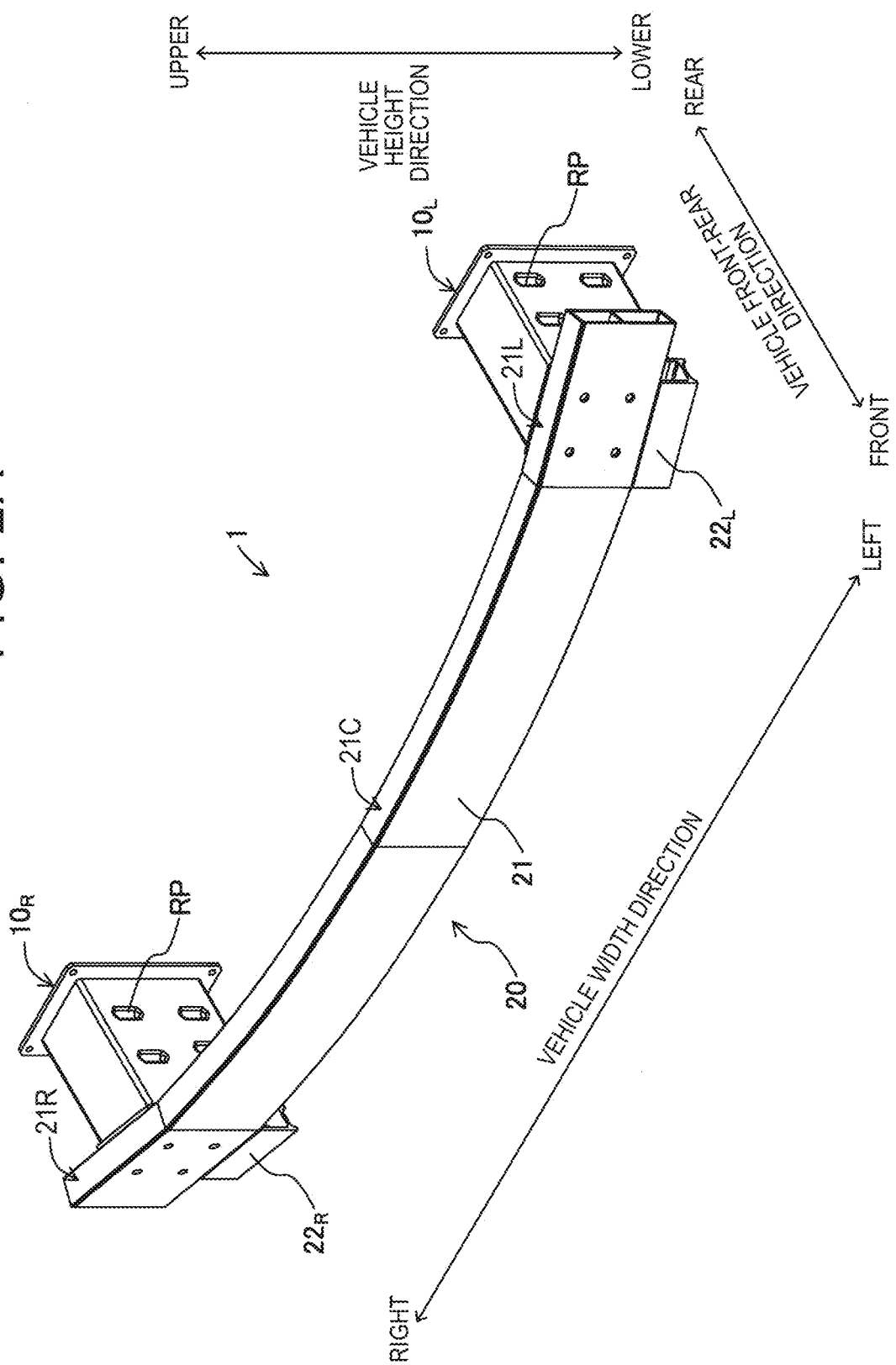

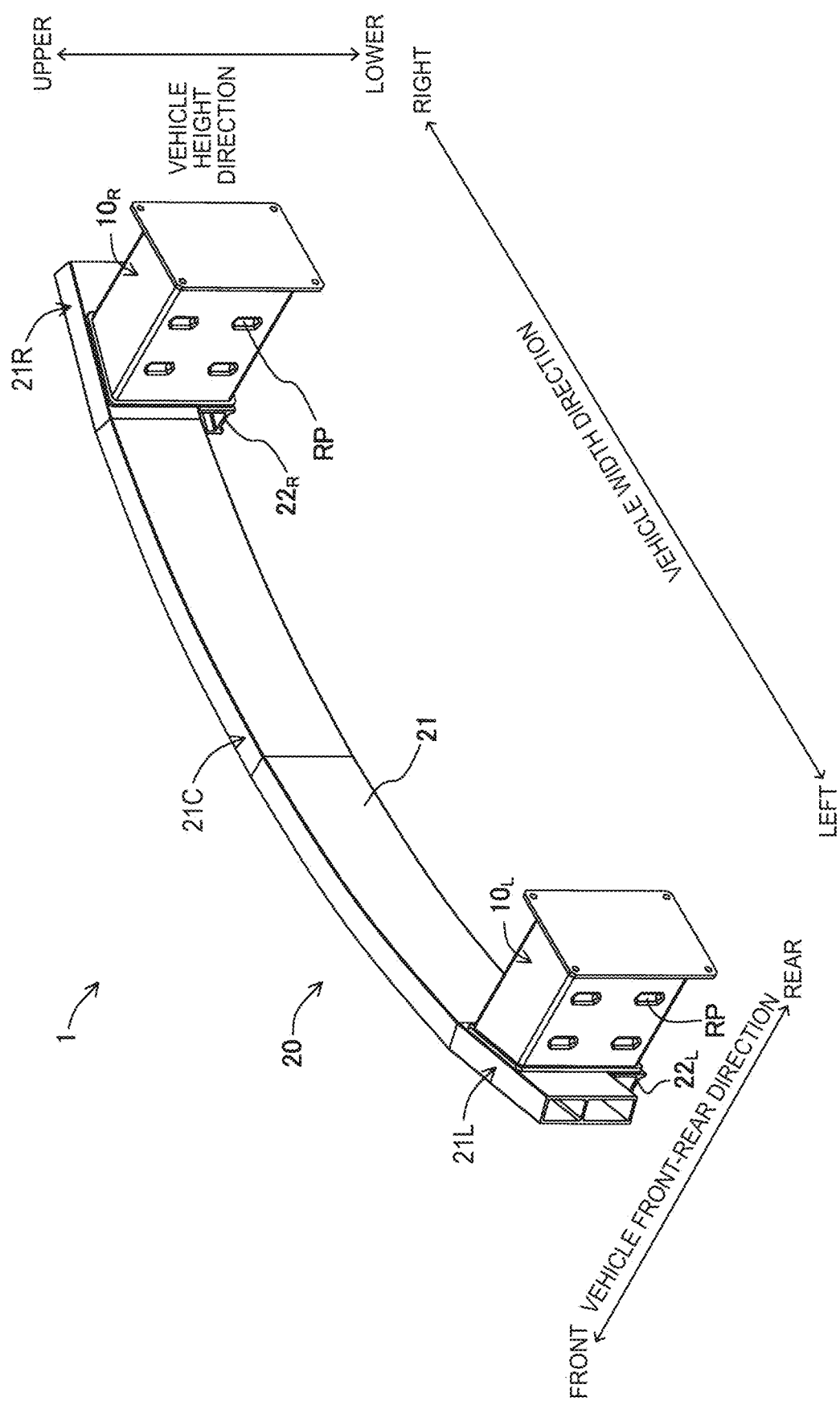

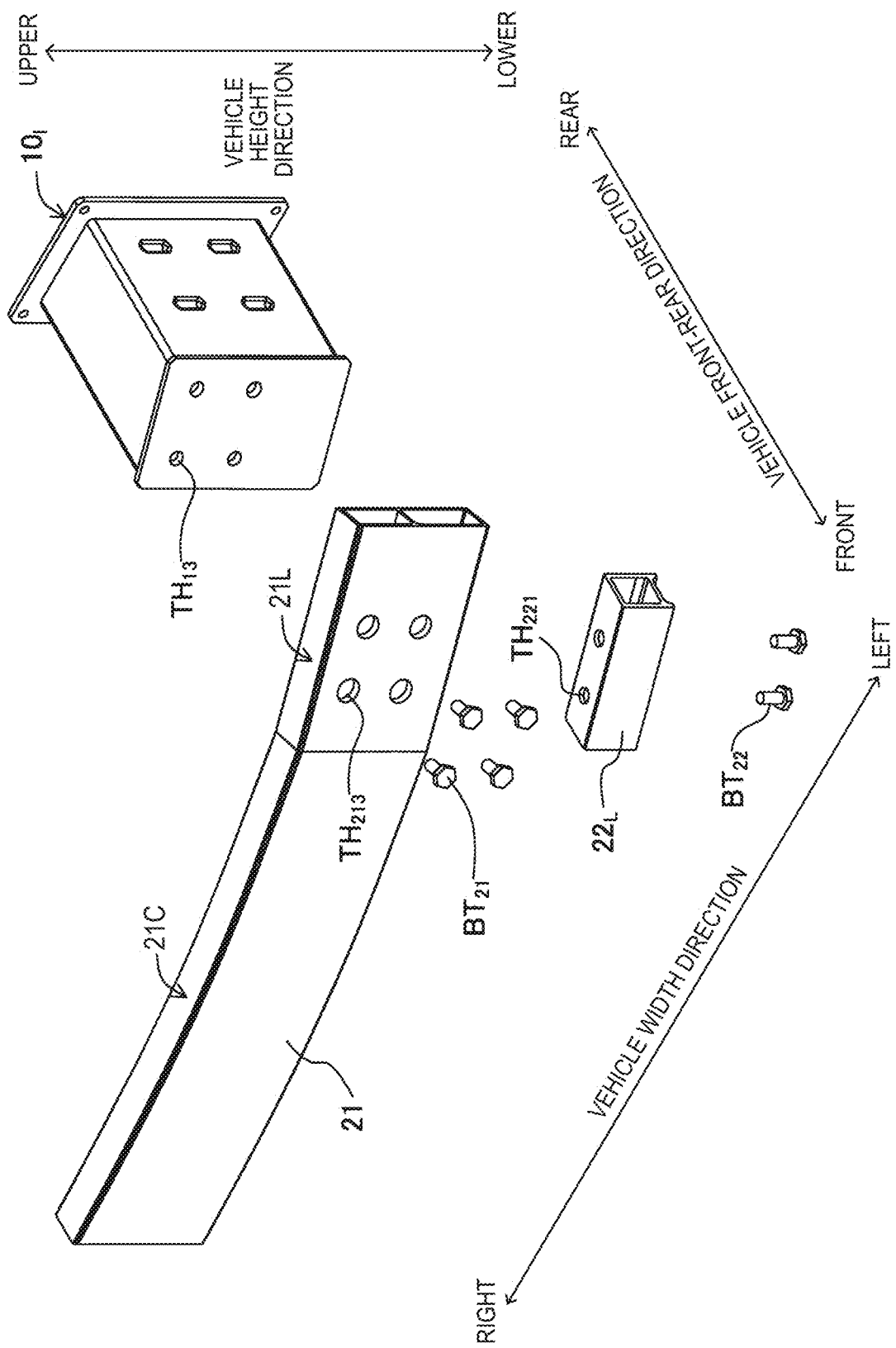

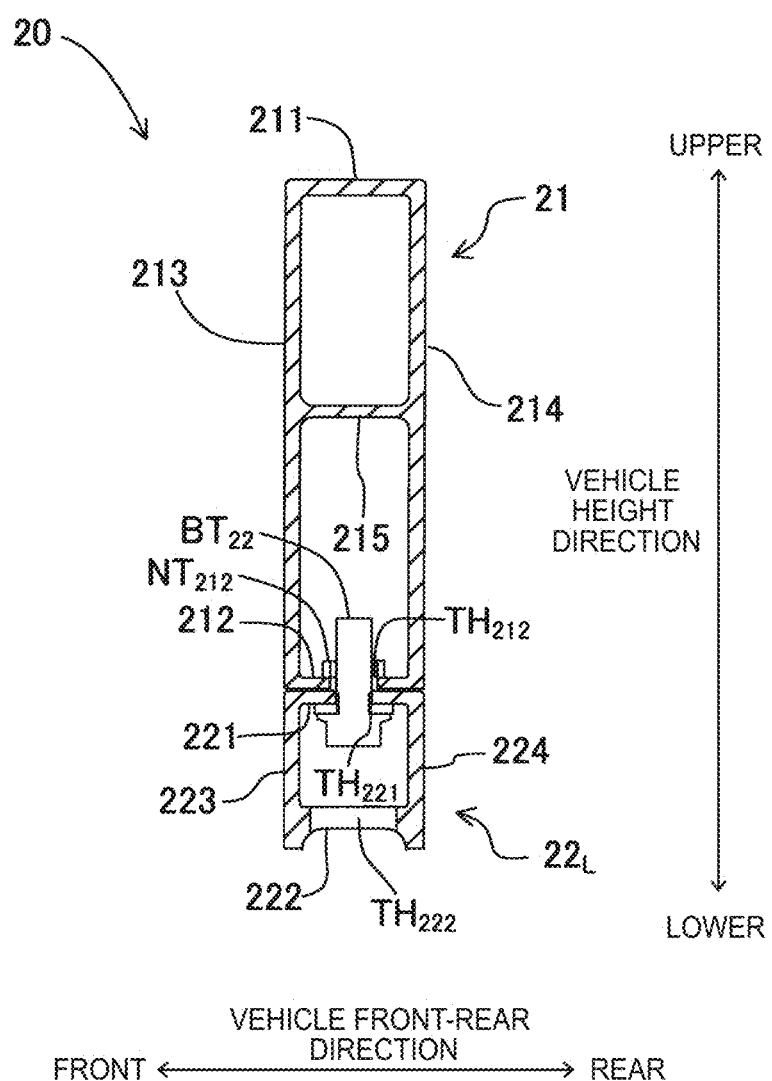

IMPACT ABSORBING DEVICE AND BUMPER REINFORCEMENT

INCORPORATION BY REFERENCE

The disclosure of Japanese Patent Application No. 2017-120405 filed on Jun. 20, 2017 including the specification, drawings and abstract is incorporated herein by reference in its entirety.

BACKGROUND

1. Technical Field

The disclosure relates to an impact absorbing device and a bumper reinforcement for a vehicle.

2. Description of Related Art

As described in Japanese Unexamined Patent Application Publication No. 2012-153252 (JP 2012-153252 A), there is known a vehicle provided with an impact absorbing member that is deformed so as to absorb an impact at the time of vehicle collision. The vehicle includes a pair of right and left side members extending in a vehicle front-rear direction, and a bumper reinforcement extending in a vehicle width direction in front of the right and left side members. The bumper reinforcement is attached to the side members through a pair of right and left impact absorbing members. Each of the impact absorbing members has a tubular shape extending in the vehicle front-rear direction. A rear end portion of each of the impact absorbing members is connected with a front end portion of a corresponding one of the side members, and a front end portion of each of the impact absorbing members is connected with a corresponding end portion of the bumper reinforcement in the vehicle width direction. When an object collides with a front end of the vehicle, the impact absorbing members are deformed so as to be compressed in their axis directions (the vehicle front-rear direction). Thus, an impact due to the collision is absorbed.

SUMMARY

In general, a radiator is disposed behind the bumper reinforcement. For example, when the bumper reinforcement integrally formed by extruding an aluminum alloy material is used, a portion of an intermediate part of the bumper reinforcement in the vehicle width direction (for example, an upper portion (a hatched portion in FIG. 16)) may be trimmed so as not to interrupt airflow towards the radiator. In this case, production cost becomes high. For example, the trimming process may be omitted when a width (length), in a vehicle height direction, of the entire bumper reinforcement (from the right end to the left end) is reduced as shown in FIG. 17 and FIG. 18. However, as described below, when a length of the bumper reinforcement in the vehicle height direction is smaller than a length of the impact absorbing member in the vehicle height direction, an impact is not absorbed well at the time of collision. For instance, in the example shown in FIG. 17 and FIG. 18, a rear surface of the bumper reinforcement is attached to positions facing lower portions of front end surfaces of the impact absorbing members. In this example, as shown in FIG. 19A and FIG. 19B, only the lower portions of the impact absorbing members are destroyed (collapsed) at the time of collision, and upper portions remain substantially undestroyed. In other words, distal end portions of the impact absorbing members are bent downward. Therefore, an amount of impact absorption in this case is smaller than that in a case where the impact absorbing member is deformed so as to be compressed in an axis direction thereof.

The disclosure provides an impact absorbing device that includes a bumper reinforcement having a relatively small length in a vehicle height direction, the impact absorbing device being able to improve impact absorbing performance. The disclosure also provides a bumper reinforcement having a relatively small length in the vehicle height direction, the bumper reinforcement being able to improve impact absorbing performance of a vehicle. The phrase "the length in the vehicle height direction is relatively small" signifies that the length of the bumper reinforcement in the vehicle height direction is smaller than a length of an impact absorbing member in the vehicle height direction, the impact absorbing member supporting the bumper reinforcement.

A first aspect of the disclosure relates to an impact absorbing device including an impact absorbing member extending in a vehicle front-rear direction; and a bumper reinforcement that extends in a vehicle width direction and is attached to a front end surface of the impact absorbing member. The bumper reinforcement includes a body portion extending in the vehicle width direction and having a length in a vehicle height direction that is smaller than a length of the impact absorbing member in the vehicle height direction, and a reinforcing portion fixed to the body portion and extending along a portion of the front end surface of the impact absorbing member, the portion being positioned above or below the body portion.

A second aspect of the disclosure relates to a bumper reinforcement configured to be attached to a front end surface of an impact absorbing member extending in a vehicle front-rear direction. The bumper reinforcement includes a body portion extending in a vehicle width direction and having a length in a vehicle height direction that is smaller than a length of the impact absorbing member in the vehicle height direction; and a reinforcing portion fixed to the body portion and extending along a portion of the front end surface of the impact absorbing member, the portion being positioned above or below the body portion.

In the above aspects, a front surface of the body portion and a front surface of the reinforcing portion may be flush with each other.

In the above aspects, a rear surface of the body portion and a rear surface of the reinforcing portion may be flush with each other.

In the above aspects, the impact absorbing member may include a plurality of wall portions extending in the vehicle front-rear direction; and at least a part of the reinforcing portion may overlap a meeting portion at which two adjacent wall portions among the plurality of wall portions of the impact absorbing member meet each other when viewed from ahead of the bumper reinforcement.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a perspective view of the impact absorbing device seen diagonally from a front left side;

FIG. 2B is a perspective view of the impact absorbing device seen diagonally from a rear left side;

FIG. 11A is an exploded perspective view of the impact absorbing device seen diagonally from the front left side;

FIG. 12 is a sectional view of the bumper reinforcement, the sectional view being perpendicular to the extending direction and showing a portion where the body portion and the reinforcing portion are fastened to each other;

DETAILED DESCRIPTION OF EMBODIMENTS

Figure 1:
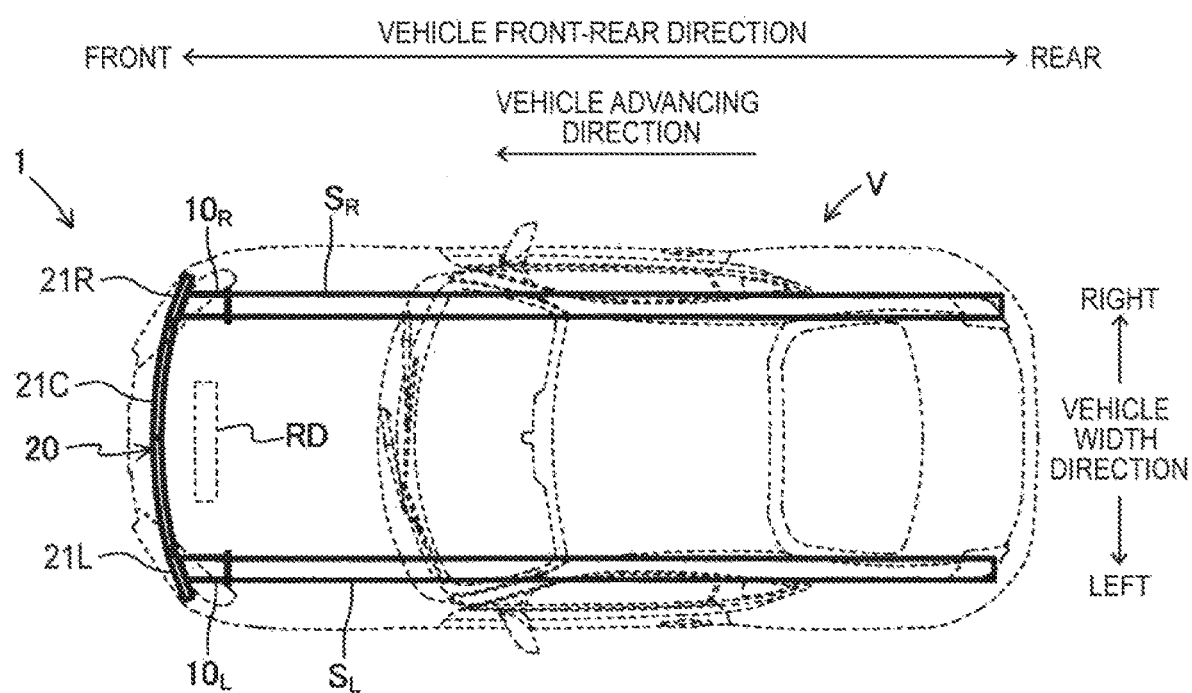
FIG. 1 is a plan view of a vehicle to which an impact absorbing device according to an embodiment of the disclosure is applied.

An impact absorbing device 1 according to an embodiment of the disclosure is described. First, a structure of a vehicle V to which the impact absorbing device 1 is applied is described. As shown in FIG. 1, the vehicle V includes a pair of right and left side members $S_R$, $S_L$ and the impact absorbing device 1.

The side members $S_R$, $S_L$ are disposed at an interval in a vehicle width direction. Each of the side members $S_R$, $S_L$ extends in the vehicle front-rear direction. Plate-shaped flange portions are provided in front end portions of the side members $S_R$, $S_L$, respectively. The impact absorbing device 1 is fastened to the flange portions. A radiator RD is disposed in a front side of space between the side member $S_R$ and the side member $S_L$.

Next, a structure of the impact absorbing device 1 is described. As shown in FIG. 2A and FIG. 2B, the impact absorbing device 1 includes a pair of right and left impact absorbing members $10_R$, $10_L$ and a bumper reinforcement 20. The impact absorbing members $10_R$, $10_L$ and the bumper reinforcement 20 are formed separately from each other, and, as described later, the bumper reinforcement 20 is fastened to the impact absorbing members $10_R$, $10_L$.

Figure 3:
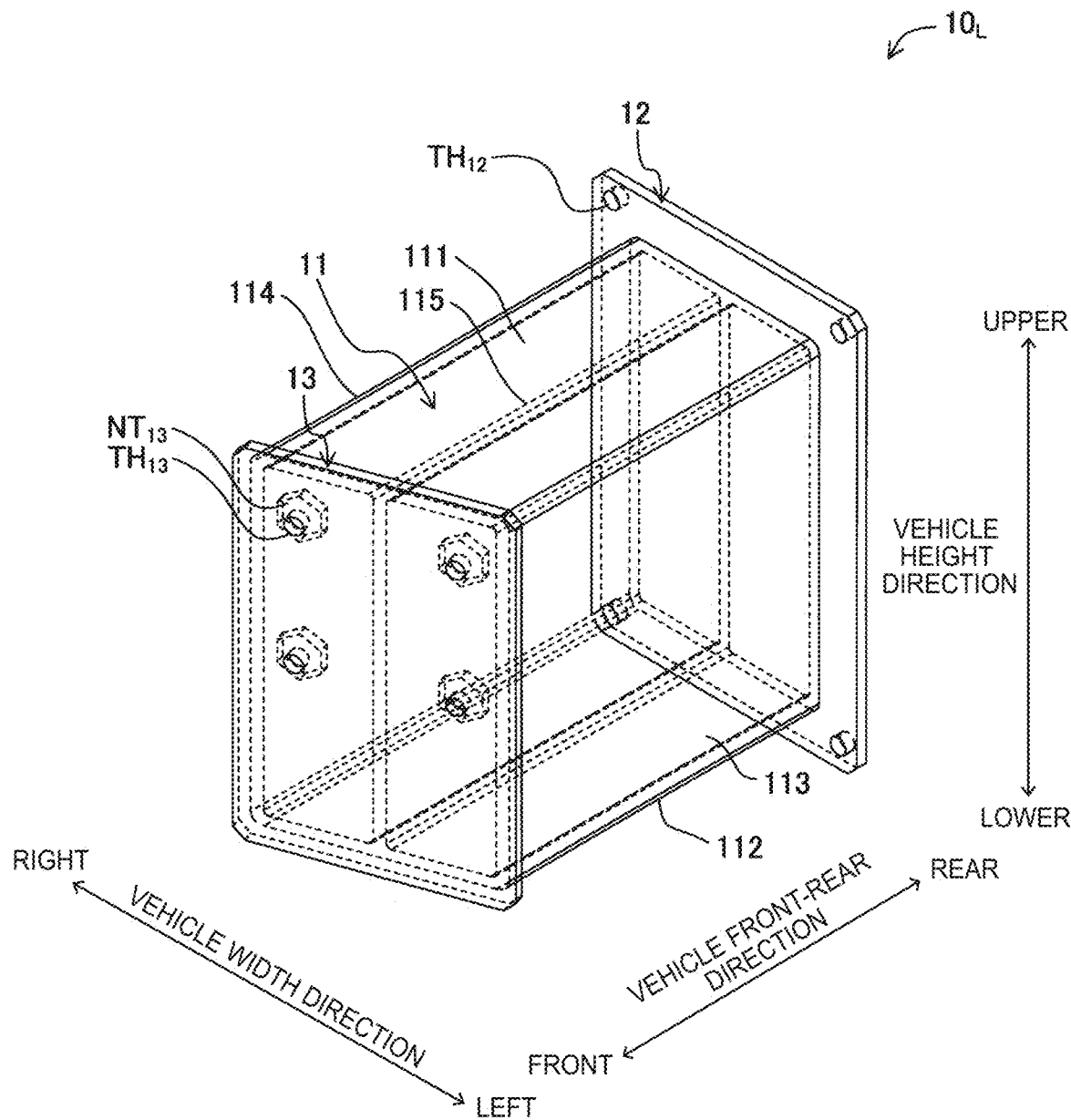
FIG. 3 is a perspective view of an impact absorbing member seen diagonally from the front left side.
Figure 4:
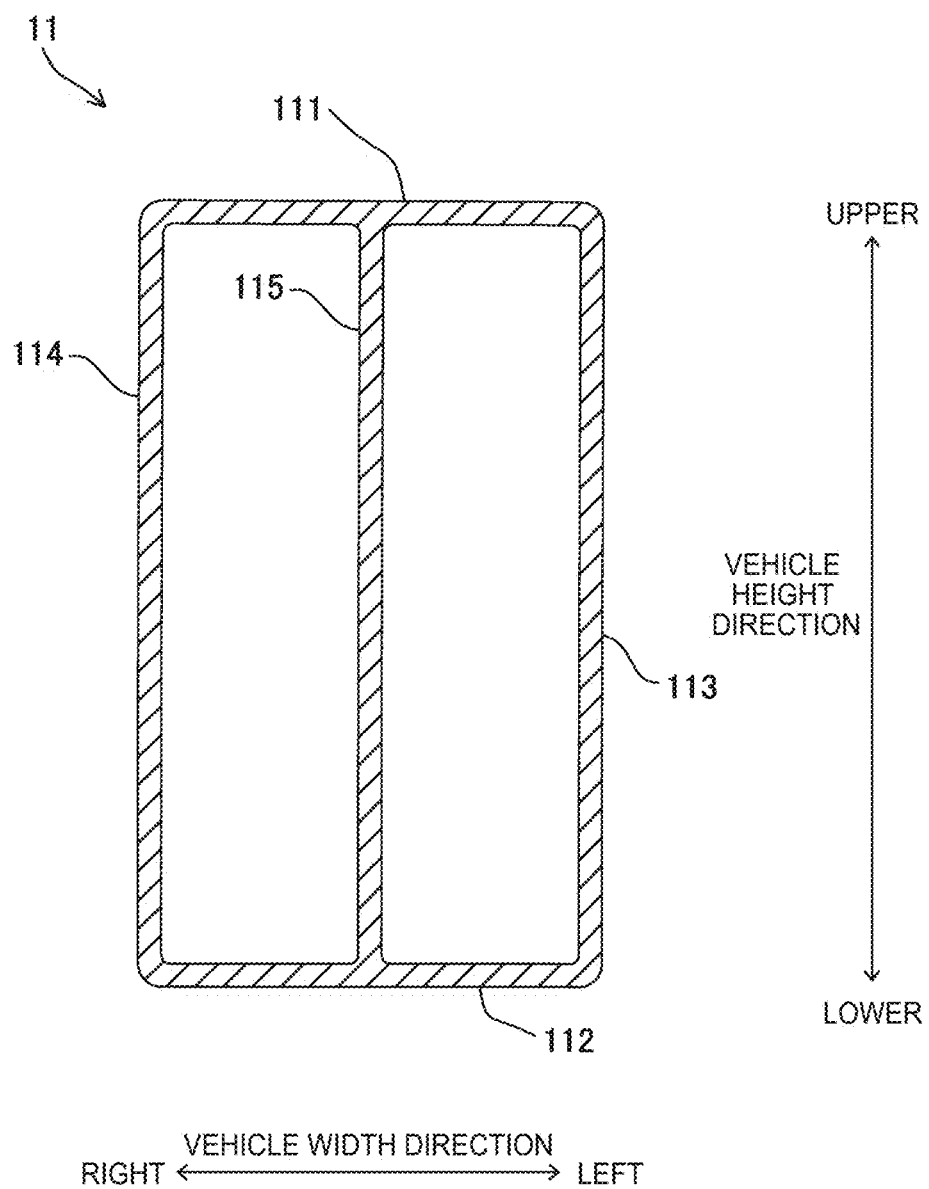
FIG. 4 is a sectional view of a body portion of the impact absorbing member seen from the front, the sectional view being perpendicular to a front-rear direction.

Next, structures of the impact absorbing members $10_R$, $10_L$ are described. A shape of the impact absorbing member $10_L$ and a shape of the impact absorbing member $10_R$ are symmetrical. Therefore, hereinafter, the structure of the impact absorbing member $10_L$ is described, and description of the structure of the impact absorbing member $10_R$ is omitted. As shown in FIG. 3, the impact absorbing member $10_L$ includes a body portion 11, a bracket portion 12, and a lid portion 13. The body portion 11 has a polygonal tubular shape (rectangular tubular shape in the embodiment) that extends in a vehicle front-rear direction. That is, as shown in FIG. 4, a section of the body portion 11 perpendicular to the vehicle front-rear direction has a rectangular shape extending in a vehicle height direction. A front end and a rear end of the body portion 11 are open. A rear end surface of the body portion 11 is perpendicular to the vehicle front-rear direction. A front end surface of the body portion 11 is inclined with respect to the vehicle front-rear direction. That is, an outer portion (a left end portion) of the front end surface in the vehicle width direction is in a more rearward position than a position of an inner portion (a right end portion) of the front end surface in the vehicle width direction (see FIG. 13). In other words, the outer portion of the front end surface in the vehicle width direction is closer to a rear portion of the vehicle than the inner portion of the front end surface in the vehicle width direction is.

Specifically, as shown in FIG. 4, the body portion 11 includes an upper wall portion 111, a lower wall portion 112, a left wall portion 113, and a right wall portion 114. Each of the upper wall portion 111 and the lower wall portion 112 has a plate shape that is perpendicular to the vehicle height direction. In a plan view of the body portion 11, each of the upper wall portion 111 and the lower wall portion 112 has a substantially trapezoidal shape (see FIG. 13). The lower wall portion 112 is disposed below the upper wall portion 111.

Each of the left wall portion 113 and the right wall portion 114 has a plate shape that is perpendicular to the vehicle width direction. The left wall portion 113 extends along left ends of the upper wall portion 111 and the lower wall portion 112. An upper end of the left wall portion 113 is connected with a left end portion of the upper wall portion 111, and a lower end of the left wall portion 113 is connected with a left end portion of the lower wall portion 112. The right wall portion 114 extends along right ends of the upper wall portion 111 and the lower wall portion 112. An upper end of the right wall portion 114 is connected with a right end portion of the upper wall portion 111, a lower end of the right wall portion 114 is connected with a right end portion of the lower wall portion 112. In an outer surface (a left surface) of the left wall portion 113 and an outer surface (a right surface) of the right wall portion 114, a plurality of recessed portions RP extending in the vehicle height direction is formed (see FIG. 2A and FIG. 2B).

The body portion 11 also includes a rib 115. The rib 115 has a plate shape perpendicular to the vehicle width direction. An upper end of the rib 115 is connected with a center portion of the upper wall portion 111 in the vehicle width direction, and a lower end of the rib 115 is connected with a center portion of the lower wall portion 112 in the vehicle width direction.

The body portion 11 is produced as follows. First, an aluminum alloy material is extruded so as to produce an intermediate extruded body having a polygonal (rectangular in this embodiment) tubular shape. An extrusion direction of the aluminum alloy material coincides with the vehicle front-rear direction. A sectional shape of the intermediate extruded body perpendicular to the extrusion direction is the same as a sectional shape of the body portion 11 perpendicular to the extending direction of the body portion 11. Next, a front end portion of the intermediate extruded body is trimmed so that the intermediate extruded body has a shape of the body portion 11. That is, the front end portion of the intermediate extruded body is cut so that the left end portion of the front end surface is in a more rearward position than the position of the right end portion of the front end surface. Then, the recessed portions RP are formed by stamping on side surfaces of the intermediate extruded body. Thus, the body portion 11 is produced.

The bracket portion 12 has a rectangular flat plate shape. The bracket portion 12 is welded to the rear end surface of the body portion 11 and closes a rear end of the body portion 11. In the state where the bracket portion 12 is attached to the body portion 11, an outer peripheral edge portion of the bracket portion 12 protrudes outward from an outer peripheral surface of the body portion 11. In the protruding portion, a plurality of through-holes $TH_{12}$ is formed (see FIG. 3).

The lid portion 13 has a rectangular flat plate shape. The lid portion 13 is welded to the front end surface of the body portion 11 and closes a front end of the body portion 11. In the state where the lid portion 13 is attached to the body portion 11, an outer peripheral edge portion of the lid portion 13 slightly protrudes outward from the outer peripheral surface of the body portion 11. In the lid portion 13, four through-holes $TH_{13}$ are formed to extend through the lid portion 13 from a front surface thereof to a rear surface thereof (see FIG. 3). The through-holes $TH_{13}$ are formed in an upper right portion and an upper left portion of the front surface (the rear surface) of the lid portion 13, respectively. The through-holes $TH_{13}$ are also formed in a substantially center portion of a right end portion of the lid portion 13 in the vehicle height direction, and in a substantially center portion of a left end portion of the lid portion 13 in the vehicle height direction, respectively. A nut $NT_{13}$ is provided for each of the through-holes $TH_{13}$. Thus, each of the nuts $NT_{13}$ is provided coaxially with a corresponding one of the through-holes $TH_{13}$. The nuts $NT_{13}$ are attached to the rear surface of the lid portion 13. That is, the nuts $NT_{13}$ are positioned in an inside of the body portion 11.

Next, a structure of the bumper reinforcement 20 is described. The bumper reinforcement 20 includes a body portion 21 and a pair of right and left reinforcing portions $22_R$, $22_L$. The body portion 21 and the reinforcing portions $22_R$, $22_L$ are formed separately from each other. As described later, the reinforcing portions $22_R$, $22_L$ are fastened to right and left end portions of the body portion 21, respectively.

Figure 5A:
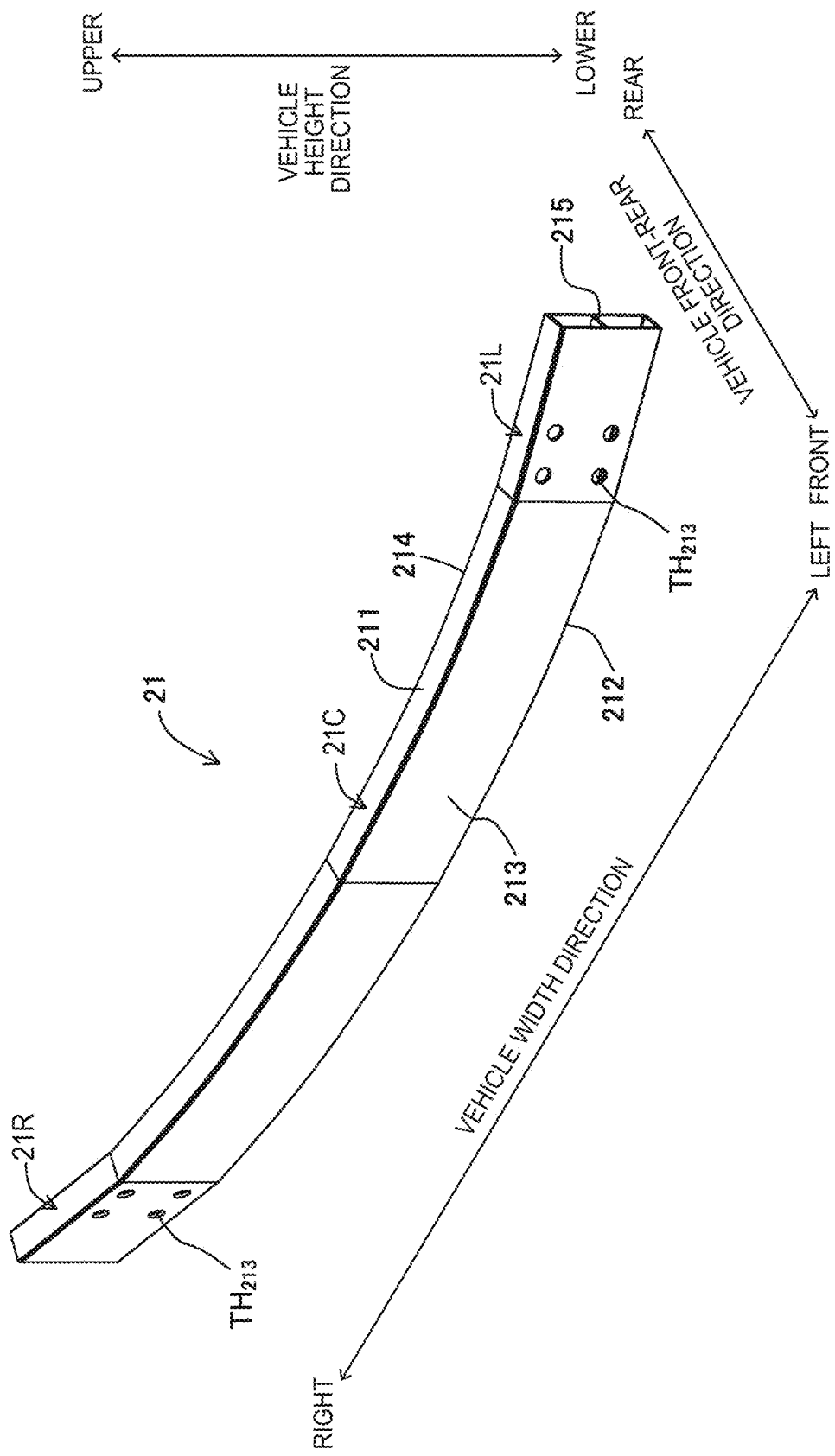
FIG. 5A is a perspective view of a body portion of a bumper reinforcement seen diagonally from the front left side.
Figure 5B:
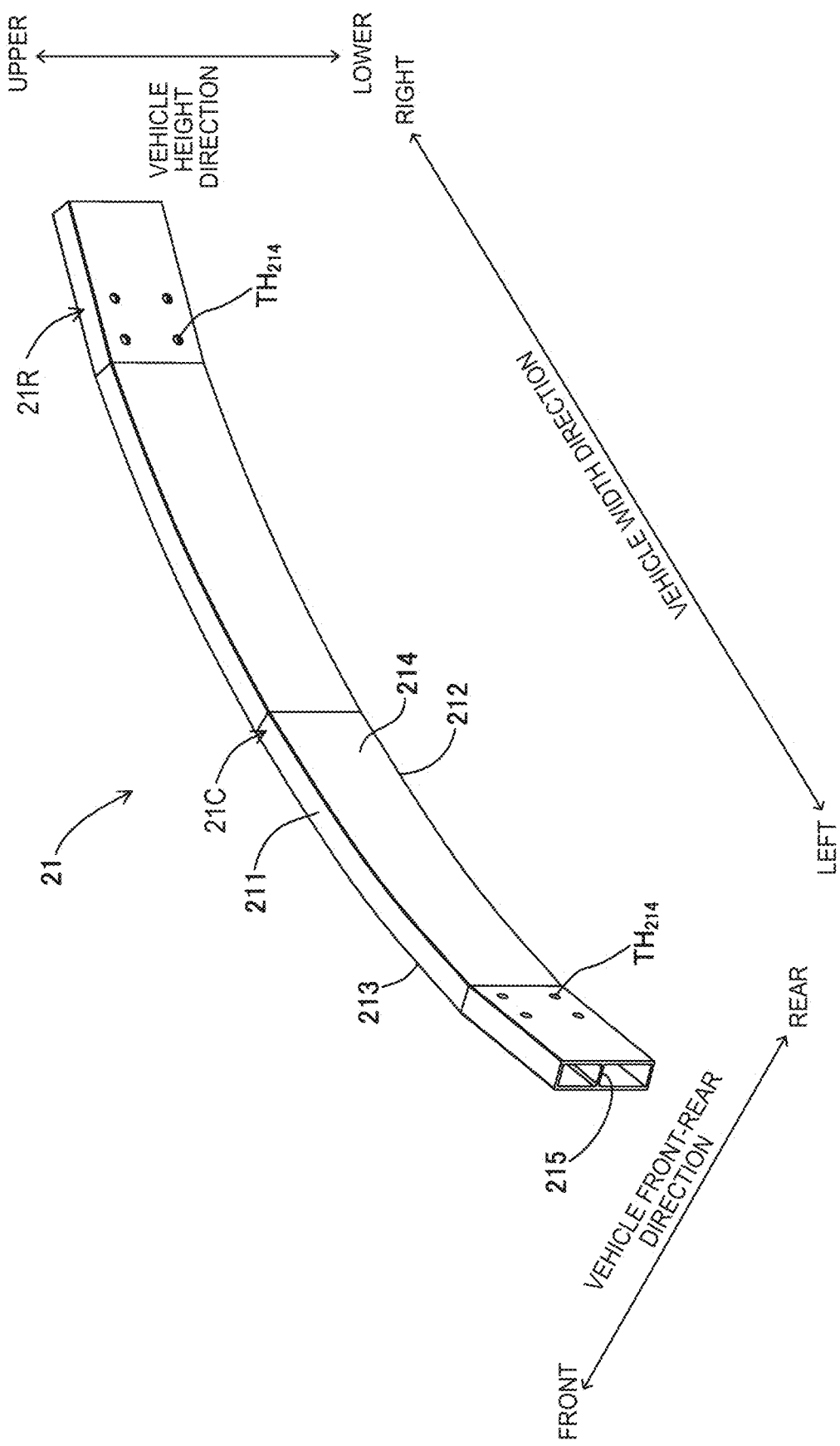
FIG. 5B is a perspective view of the body portion of the bumper reinforcement seen diagonally from the rear left side.
Figure 6:
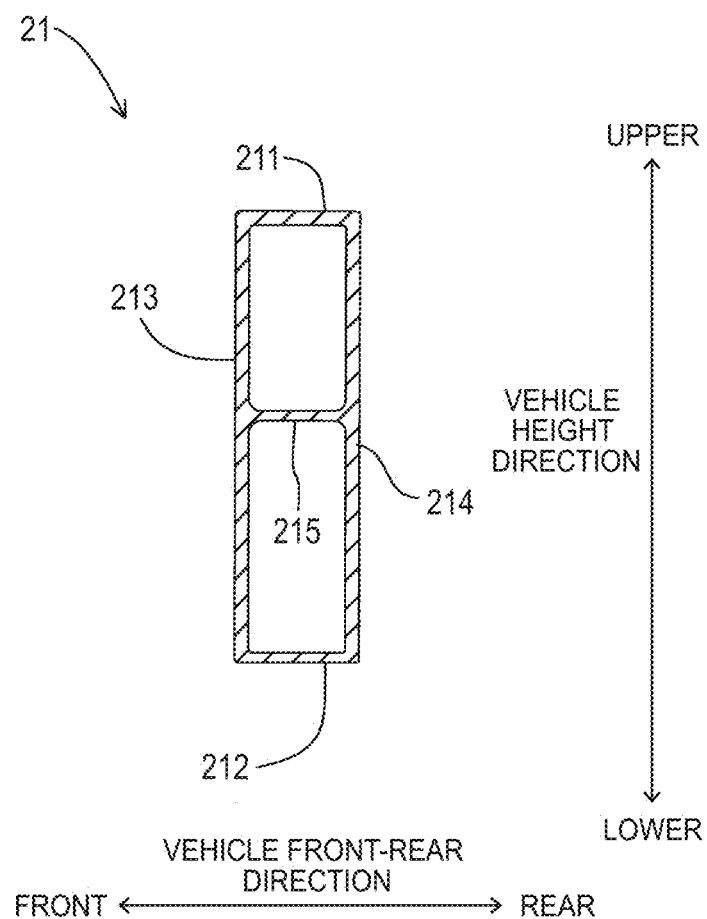
FIG. 6 is a sectional view of the body portion of the bumper reinforcement, the sectional view being perpendicular to an extending direction of the body portion.
Figure 14:
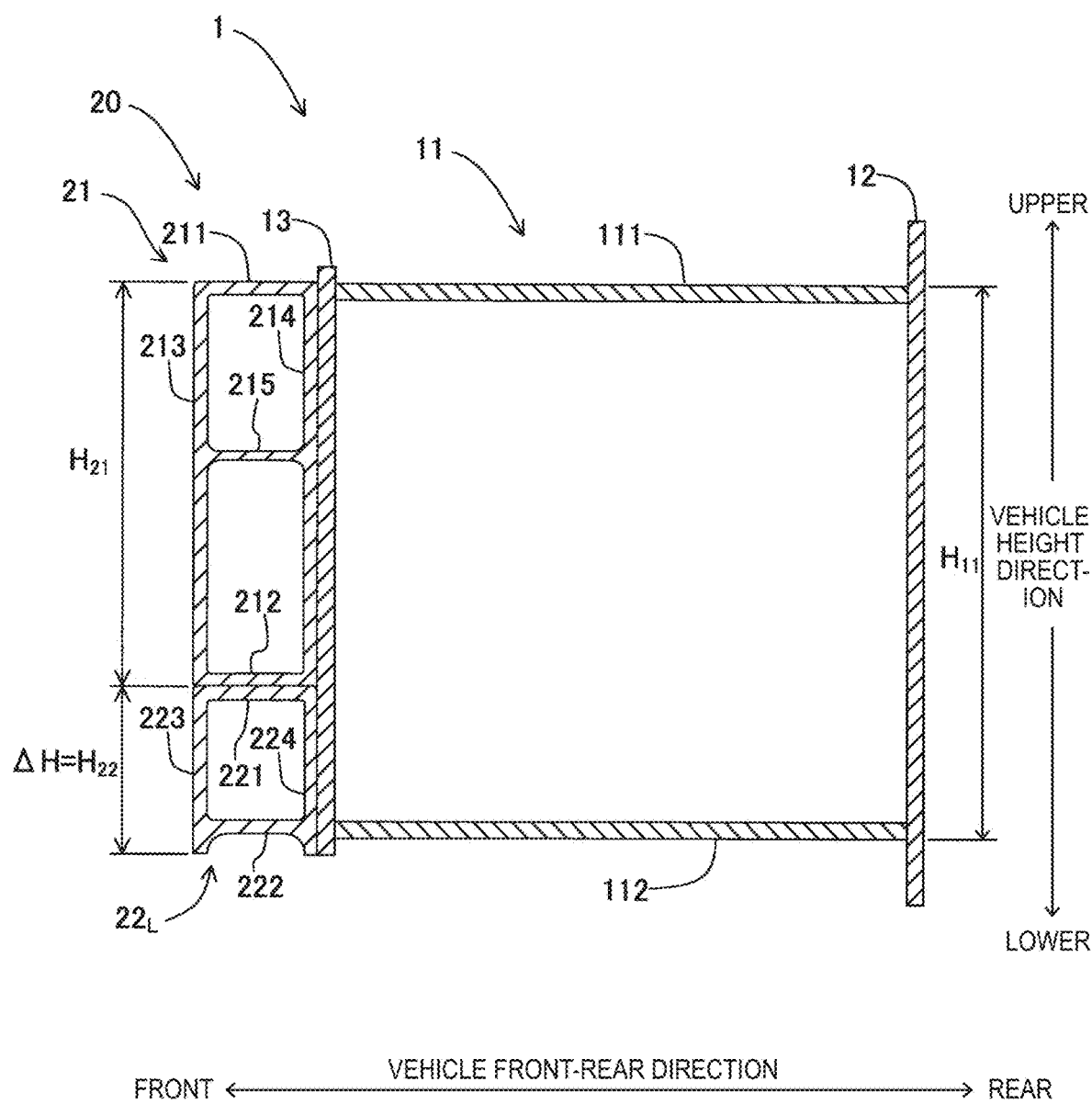
FIG. 14 is a sectional view of the bumper reinforcement and the impact absorbing member, the sectional view being perpendicular to the vehicle width direction.

As shown in FIG. 5A and FIG. 5B, the body portion 21 has a polygonal tubular shape (rectangular tubular shape) extending in the vehicle width direction. As shown in FIG. 6, an external shape of a section of the body portion 21 perpendicular to a longitudinal direction thereof is a rectangle extending in the vehicle height direction. The shape and size of the section is constant from one end to the other end of the body portion 21 in the longitudinal direction. In a plan view of the body portion 21, the body portion 21 is curved so as to have an arch shape. It should be noted that, however, an intermediate portion 21C of the body portion 21 in the vehicle width direction (a portion positioned in front of the radiator RD) is curved, and a right end portion 21R and a left end portion 21L of the body portion 21 are formed to extend linearly along front end surfaces of an impact absorbing member $10_R$ and an impact absorbing member $10_L$ (front surfaces of the lid portions 13), respectively (see FIG. 1). A curvature of the intermediate portion 21C of the body portion 21 is determined in accordance with a design of a front end portion of a vehicle (a shape of a bumper cover). Also, a length $H_{21}$ of the body portion 21 in the vehicle height direction is smaller than a length $H_{11}$ of the body portion 11 of each of the impact absorbing members $10_R$, $10_L$ in the vehicle height direction (see FIG. 14).

The body portion 21 includes an upper wall portion 211, a lower wall portion 212, a front wall portion 213, a rear wall portion 214, and a rib 215. Each of the upper wall portion 211, the lower wall portion 212, and the rib 215 has a plate shape perpendicular to the vehicle height direction. The upper wall portion 211, the lower wall portion 212, and the rib 215 have the same shape. The rib 215 is disposed between the upper wall portion 211 and the lower wall portion 212. Each of the front wall portion 213 and the rear wall portion 214 has a plate shape that is perpendicular to the upper wall portion 211, the lower wall portion 212, and the rib 215. The front wall portion 213 extends along front ends of the upper wall portion 211, the lower wall portion 212, and the rib 215. The rear wall portion 214 extends along rear ends of the upper wall portion 211, the lower wall portion 212, and the rib 215. Parts of the upper wall portion 211, the lower wall portion 212, the front wall portion 213, the rear wall portion 214, and the rib 215 are curved so as to have the arch shape as described earlier, the parts being in the intermediate portion 21C. Further, parts of the upper wall portion 211, the lower wall portion 212, the front wall portion 213, the rear wall portion 214, and the rib 215 are formed to extend linearly as described earlier, the parts being in the right end portion 21R and the left end portion 21L.

Four through-holes $TH_{213}$ are formed in each of parts of the front wall portion 213. The parts of the front wall portion 213 are in the right end portion 21R and the left end portion 21L, and are positioned in front of the impact absorbing member $10_R$ and the impact absorbing member $10_L$, respectively, in a state where the bumper reinforcement 20 is fastened to the impact absorbing members $10_R$, $10_L$ (see FIG. 5A). Also, four through-holes $TH_{214}$ are formed in each of parts of the rear wall portion 214. The parts of the rear wall portion 214 are in the right end portion 21R and the left end portion 21L, and are positioned in front of the impact absorbing member $10_R$ and the impact absorbing member $10_L$, respectively, in the state where the bumper reinforcement 20 is fastened to the impact absorbing members $10_R$, $10_L$ (see FIG. 5B). The through-holes $TH_{213}$ and the through-holes $TH_{214}$ correspond to the through-holes $TH_{13}$ of the lid portion 13. That is, the positions of the through-holes $TH_{213}$ and the through-holes $TH_{214}$ are set such that the through-holes $TH_{213}$, the through-holes $TH_{214}$, and the through-holes $TH_{13}$ are coaxially disposed (see FIG. 13). An inner diameter of each of the through-holes $TH_{214}$ is the same as an inner diameter of each of the through-holes $TH_{13}$. An inner diameter of each of the through-holes $TH_{213}$ is slightly larger than the inner diameter of each of the through-holes $TH_{214}$. The inner diameter of each of the through-holes $TH_{213}$ is slightly larger than an outer diameter of a head portion of each of bolts $BT_{21}$ used for fixing the body portion 21 (of the bumper reinforcement 20) to the impact absorbing members $10_R$, $10_L$.

Further, two through-holes $TH_{212}$ are formed in a part of the lower wall portion 212. The part of the lower wall portion 212 is in the left end portion 21L and is positioned in front of the impact absorbing member $10_L$. One of the two through-holes $TH_{212}$ is positioned in front of space between the left wall portion 113 and the rib 115, and the other one of the two through-holes $TH_{212}$ is positioned in front of space between the right wall portion 114 and the rib 115 (see FIG. 13). A nut $NT_{212}$ is provided for each of the through-holes $TH_{212}$. That is, each of the nuts $NT_{212}$ is disposed coaxially with a corresponding one of the through-holes $TH_{212}$. The nuts $NT_{212}$ are attached to an upper surface of the lower wall portion 212. The through-holes $TH_{212}$ and the nuts $NT_{212}$ are also provided in a part of the lower wall portion 212, the part being in the right end portion 21R.

The body portion 21 is produced as follows. First, an aluminum alloy material is extruded, and thus, a tubular intermediate extruded body that extends linearly is produced (an extrusion process). An extrusion direction of the aluminum alloy material coincides with the vehicle width direction. A sectional shape of the intermediate extruded body perpendicular to the extrusion direction is the same as a sectional shape of the body portion 21 perpendicular to the axis direction. The intermediate extruded body is then bent so as to match the design of the front end portion of the vehicle V (a bending process). Then, the through-holes $TH_{212}$, $TH_{213}$, $TH_{214}$ are formed in each of a right end portion and a left end portion of the intermediate extruded body (a hole machining process). Next, the nuts $NT_{212}$ are attached to the upper surface of the lower wall portion 212. Thus, the body portion 21 is produced.

Next, structures of the reinforcing portions $22_R$, $22_L$ are described. The reinforcing portions $22_R$, $22_L$ extend linearly along the portions of the right end portion 21R and the left end portion 21L of the body portion 21, respectively. The portions of the right end portion 21R and the left end portion 21L are positioned in front of the impact absorbing member $10_R$ and the impact absorbing member $10_L$, respectively. The reinforcing portion $22_L$ and the reinforcing portion $22_R$ are symmetrical. Therefore, hereinafter, the structure of the reinforcing portion $22_L$ is described, and description of the reinforcing portion $22_R$ is omitted.

Figure 7A:
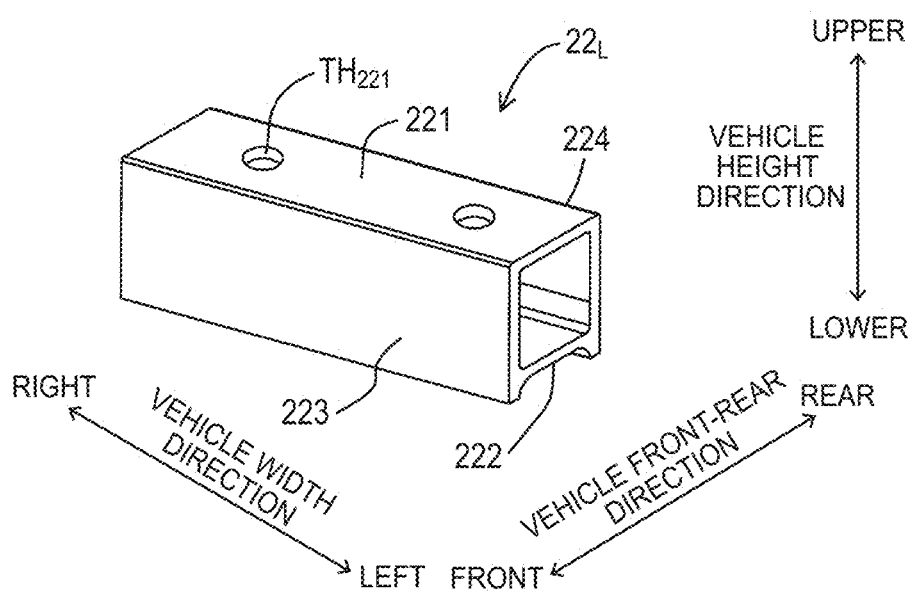
FIG. 7A is a perspective view of a reinforcing portion seen diagonally from an upper left side.
Figure 7B:
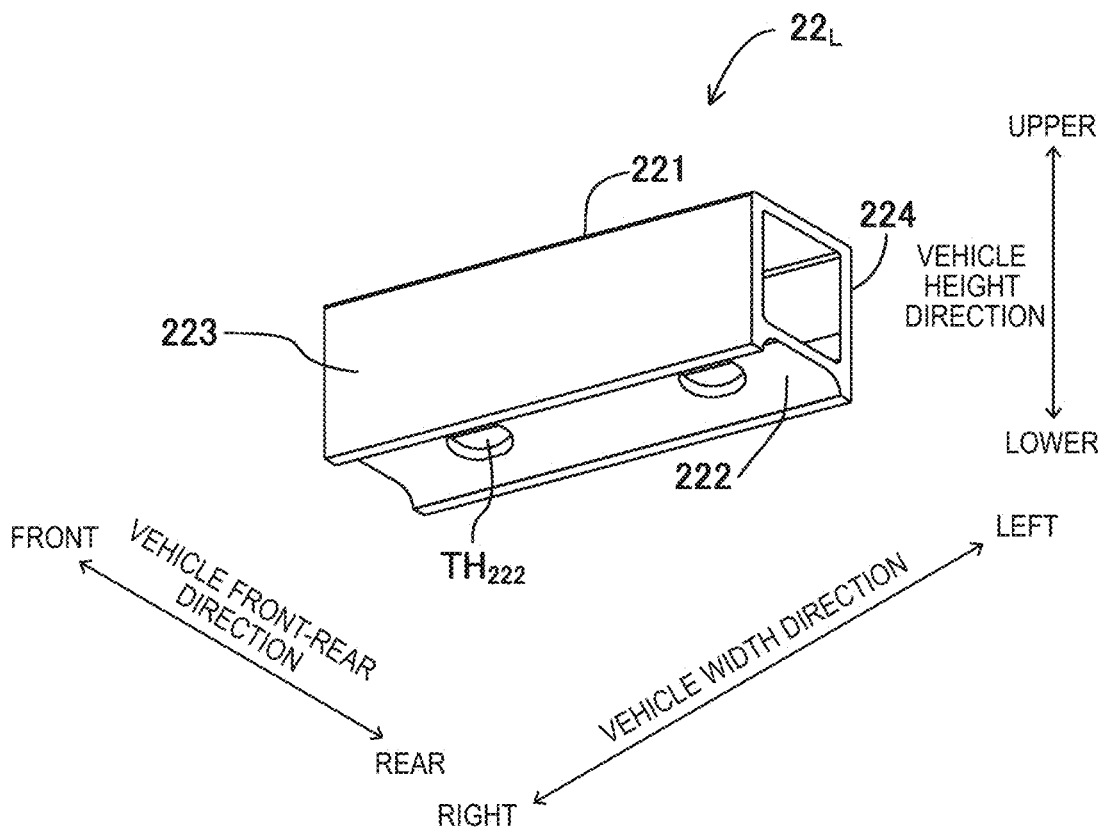
FIG. 7B is a perspective view of the reinforcing portion seen diagonally from a lower left side.
Figure 8:
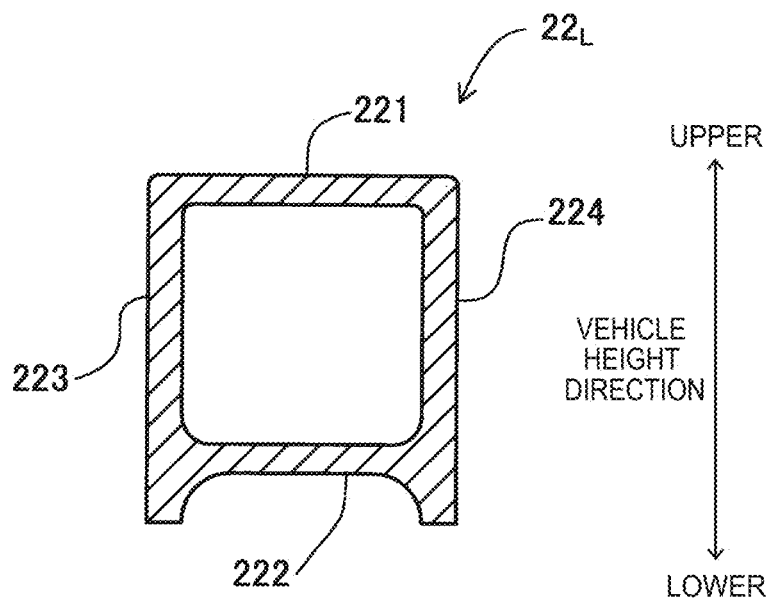
FIG. 8 is a sectional view of the reinforcing portion, the sectional view being perpendicular to the extending direction of the reinforcing portion.

As shown in FIG. 7A and FIG. 7B, the reinforcing portion $22_L$ has a polygonal tubular shape (in the embodiment, a rectangular tubular shape) extending in parallel to an extending direction of the left end portion 21L of the body portion 21. As shown in FIG. 8, a section of the reinforcing portion $22_L$ perpendicular to an extending direction thereof has a substantially rectangular shape. A left end surface and a right end surface of the reinforcing portion $22_L$ are perpendicular to the vehicle width direction. The right end surfaces and the left end surfaces of the reinforcing portions $22_R$, $22_L$ are open.

Figure 9:
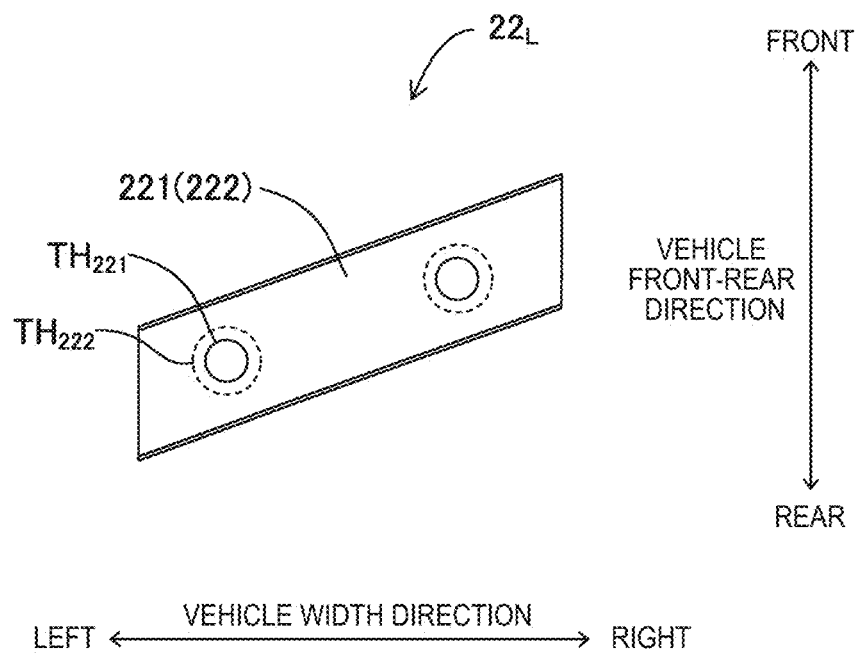
FIG. 9 is a plan view of the reinforcing portion.

The reinforcing portion $22_L$ includes an upper wall portion 221, a lower wall portion 222, a front wall portion 223, and a rear wall portion 224. Each of the upper wall portion 221 and the lower wall portion 222 has a plate shape that is perpendicular to the vehicle height direction. As shown in FIG. 9, in a plan view of the reinforcing portion $22_L$, each of the upper wall portion 221 and the lower wall portion 222 has a shape of a parallelogram that extends in the vehicle width direction. Long sides (sides at front and rear ends) of the upper wall portion 221 and the lower wall portion 222 are parallel to the extending direction of the left end portion 21L of the body portion 21. Short sides (sides at right and left ends) of the upper wall portion 221 and the lower wall portion 222 are perpendicular to the vehicle width direction.

Each of the front wall portion 223 and the rear wall portion 224 has a plate shape perpendicular to the upper wall portion 221 and the lower wall portion 222. The front wall portion 223 extends along front ends of the upper wall portion 221 and the lower wall portion 222. The rear wall portion 224 extends along rear ends of the upper wall portion 221 and the lower wall portion 212. An upper end of the front wall portion 223 and an upper end of the rear wall portion 224 are positioned at the same height as that of an upper surface of the upper wall portion 221. A lower end of the front wall portion 223 and a lower end of the rear wall portion 224 are located at a position slightly lower than that of a lower surface of the lower wall portion 222 (see FIG. 8).

Through-holes $TH_{221}$ are respectively formed in both end portions of the upper wall portion 221 in the extending direction (the extending direction of the reinforcing portion $22_L$), and through-holes $TH_{222}$ are respectively formed in both end portions of the lower wall portion 222 in the extending direction. The through-holes $TH_{221}$ and the through-holes $TH_{222}$ correspond to the through-holes $TH_{212}$ of the body portion 21. That is, the through-holes $TH_{221}$, the through-holes $TH_{222}$, and the through-holes $TH_{212}$ are coaxially disposed (see FIG. 13). An inner diameter of each of the through-holes $TH_{221}$ is the same as the inner diameter of each of the through-holes $TH_{214}$. An inner diameter of each of the through-holes $TH_{222}$ is slightly larger than the inner diameter of each of the through-holes $TH_{221}$. The inner diameter of each of the through-holes $TH_{222}$ is slightly larger than an outer diameter of a head portion of each of bolts $BT_{22}$ that are used for fixing the reinforcing portion $22_L$ to the body portion 21.

Figure 15:
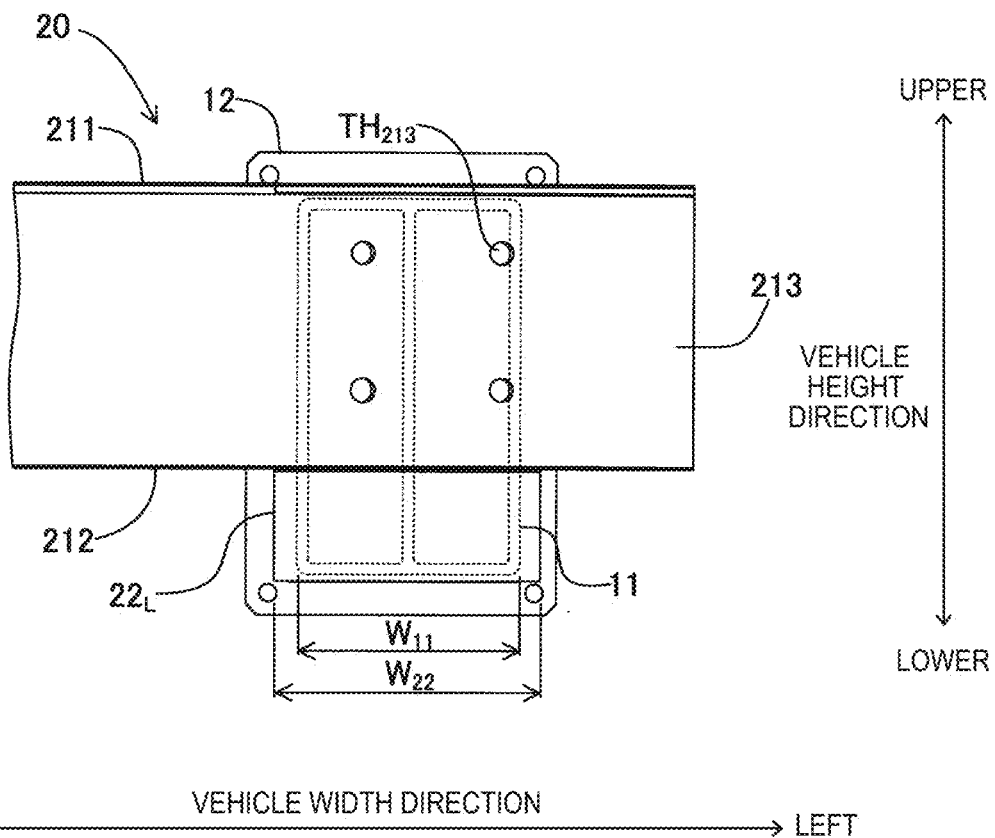
FIG. 15 is a front view of the impact absorbing device seen from the front.

A length $W_{22}$ of the reinforcing portion $22_L$ in the vehicle width direction (a distance between a right end surface and a left end surface) is slightly larger than a length $W_{11}$ of the body portion 11 of the impact absorbing member $10_L$ in the vehicle width direction (see FIG. 15). A length $H_{22}$ of the reinforcing portion $22_L$ in the vehicle height direction is substantially the same as a difference $\Delta H$ ($=H_{11}-H_{21}$) between a length $H_{11}$ of the body portion 11 of the impact absorbing member $10_L$ in the vehicle height direction and a length $H_{21}$ of the body portion 21 in the vehicle height direction (see FIG. 14). A length $D_{22}$ of the reinforcing portion $22_L$ perpendicular to the vehicle height direction and the center axis direction (a distance between a front surface and a rear surface) is substantially the same as a length $D_{21}$ of the left end portion 21L of the body portion 21 perpendicular to the vehicle height direction and the center axis direction (see FIG. 13).

Figure 10:
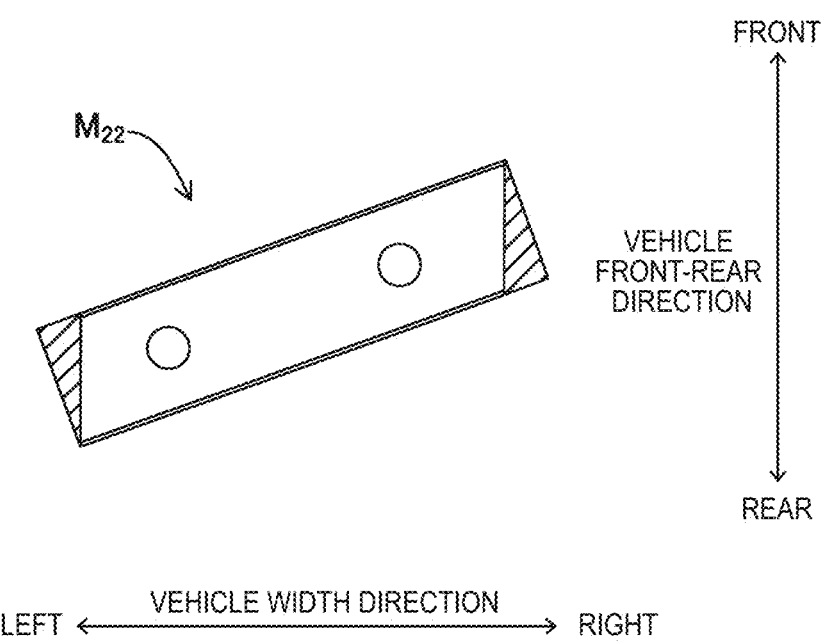
FIG. 10 is a plan view of an intermediate extruded body of the reinforcing portion.

The reinforcing portion $22_L$ is produced as follows. First, an aluminum alloy material is extruded, and thus, an intermediate extruded body $M_{22}$ (see FIG. 10) having a tubular shape that extends linearly is produced (an extrusion process). An extrusion direction of the aluminum alloy material coincides with the extending direction of the reinforcing portion $22_L$. A sectional shape of the intermediate extruded body $M_{22}$ perpendicular to the extrusion direction of the intermediate extruded body $M_{22}$ is the same as a sectional shape of the reinforcing portion $22_L$ perpendicular to the extending direction of the reinforcing portion $22_L$. Next, both end portions of the intermediate extruded body $M_{22}$ in the extending direction are trimmed so that the intermediate extruded body $M_{22}$ has the shape of the reinforcing portion $22_L$ described above. That is, the both end portions are cut so that right and left end surfaces of the intermediate extruded body $M_{22}$ become perpendicular to the vehicle width direction. Then, the through-holes $TH_{221}$ are respectively formed in the both end portions of the intermediate extruded body $M_{22}$ in the extending direction, and the through-holes $TH_{222}$ are respectively formed in the both end portions of the intermediate extruded body $M_{22}$ in the extending direction (a hole machining process). Thus, the reinforcing portion $22_L$ is produced.

Figure 11B:
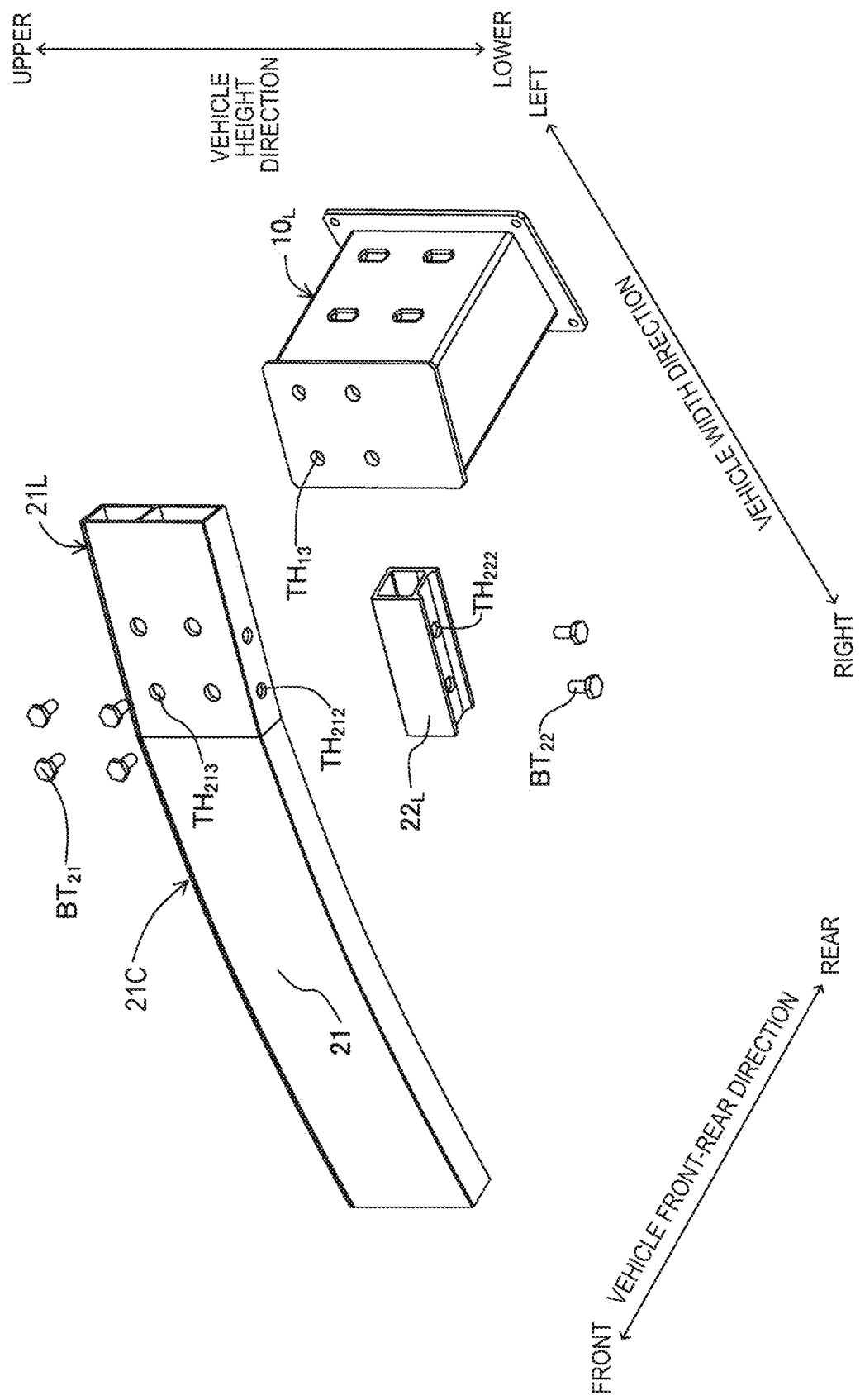
FIG. 11B is an exploded perspective view of the impact absorbing device seen diagonally from the rear left side.

The reinforcing portion $22_L$ is fastened to the body portion 21 as follows. As shown in FIG. 11A, FIG. 11B, and FIG. 12, the bolts $BT_{22}$ are inserted into the reinforcing portion $22_L$ from the through-holes $TH_{222}$, respectively. Then, distal ends of the bolts $BT_{22}$ are inserted into the through-holes $TH_{222}$ and the through-holes $TH_{212}$ and then fastened to nuts $NT_{212}$, respectively. Thus, the reinforcing portion $22_L$ is fastened to the body portion 21. Similarly to the reinforcing portion $22_L$, the reinforcing portion $22_R$ is fastened to the right end portion 21R of the body portion 21. Thus, the bumper reinforcement 20 is manufactured. The operation can be easily performed when the body portion 21 is placed upside down and the reinforcing portions $22_R$, $22_L$ are attached to the body portion 21 from above.

Next, steps of attaching the impact absorbing device 1 to the side members $S_R$, $S_L$ are described. First, bolts (not shown) are inserted in the through-holes $TH_{12}$ of the bracket portions 12 of the impact absorbing members $10_R$, $10_L$. The impact absorbing members $10_R$, $10_L$ are respectively fastened to the flange portions of the side members $S_R$, $S_L$ with the use of the bolts.

Next, the bumper reinforcement 20 is fastened to the front end surfaces of the impact absorbing members $10_R$, $10_L$. Specifically, the bolts $BT_{21}$ are inserted into the body portion 21 from the through-holes $TH_{213}$. Then, the distal ends of the bolts $BT_{21}$ are inserted in the through-holes $TH_{214}$ and the through-holes $TH_{13}$ and fastened to the nuts $NT_{13}$ (see FIG. 13). Thus, the bumper reinforcement 20 is fastened to the front end surfaces of the impact absorbing members $10_R$, $10_L$. The reinforcing portions $22_R$, $22_L$ are fastened to the body portion 21 in advance.

Figure 13:
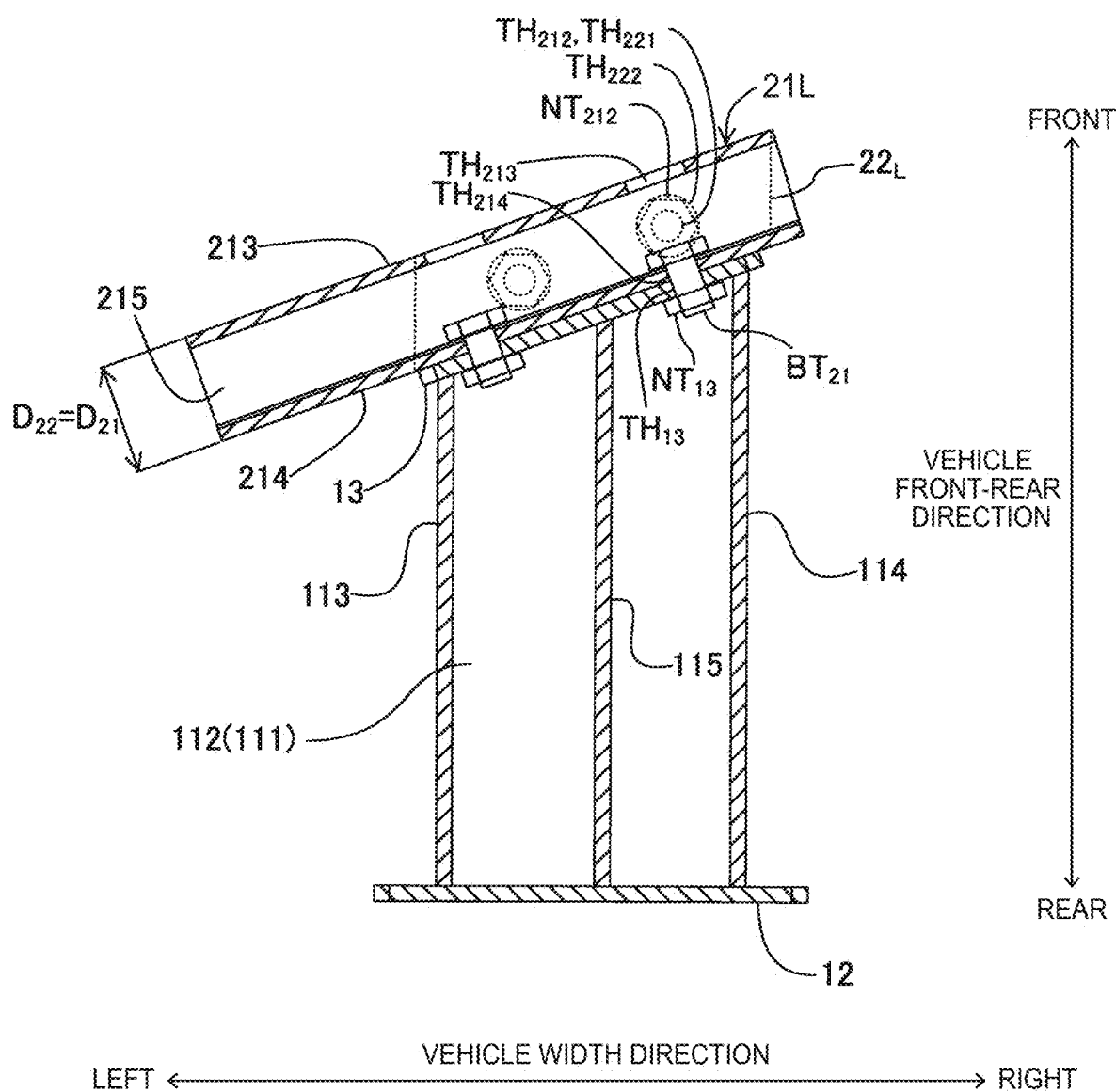
FIG. 13 is a sectional view of a left end portion of the impact absorbing device, the sectional view being perpendicular to the vehicle height direction.

As shown in FIG. 13, in the state where the impact absorbing device 1 is attached to the side members $S_R$, $S_L$, the front surface of the left end portion 21L of the body portion 21 and the front surface of the reinforcing portion $22_L$ are flush with each other (the front surface of the left end portion 21L of the body portion 21 and the front surface of the reinforcing portion $22_L$ are positioned in the same plane). Also, the rear surface of the left end portion 21L of the body portion 21 and the rear surface of the reinforcing portion $22_L$ are flush with each other (the rear surface of the left end portion 21L of the body portion 21 and the rear surface of the reinforcing portion $22_L$ are positioned in the same plane). Further, the front surface of the right end portion 21R of the body portion 21 and the front surface of the reinforcing portion $22_R$ are flush with each other. Furthermore, the rear surface of the right end portion 21R of the body portion 21 and the rear surface of the reinforcing portion $22_R$ are flush with each other.

The upper surface of the upper wall portion 211 of the body portion 21 and the upper surface of the body portion 11 are substantially flush with each other. The lower surface of the lower wall portion 222 of each of the reinforcing portions $22_R$, $22_L$, and the lower surface of the lower wall portion 112 of the body portion 11 are substantially flush with each other (see FIG. 14).

As described above, in the embodiment, the length $H_{21}$ of the body portion 21 in the vehicle height direction is set so as to be smaller than the length $H_{11}$ of the body portion 11 in the vehicle height direction. Therefore, lower end portions of the impact absorbing members $10_R$, $10_L$ are positioned below the lower surface of the body portion 21 (i.e., lower end portions of the impact absorbing members $10_R$, $10_L$ are positioned lower than the lower surface of the body portion 21). The reinforcing portions $22_R$, $22_L$ are positioned in front of portions of the impact absorbing members $10_R$, $10_L$, respectively, the portions being positioned below the lower surface of the body portion 21. That is, the reinforcing portions $22_R$, $22_L$ extend along portions of the front end surfaces of the impact absorbing members $10_R$, $10_L$, the portions being positioned below the body portion 21. In other words, when viewed from ahead of the bumper reinforcement 20 (i.e., in a front view of the impact absorbing device 1), the front surfaces (the rear surfaces) of the reinforcing portions $22_R$, $22_L$ overlap the portions of the front end surfaces of the impact absorbing members $10_R$, $10_L$, respectively, the portions being positioned below the body portion 21 (see FIG. 15). The reinforcing portions $22_R$, $22_L$ are fixed to the lower surface of the body portion 21.

Therefore, when an object collides with the vehicle V from the front side, a rearward load is applied to the front surface of the bumper reinforcement 20. In that case, the body portion 21 and the reinforcing portions $22_R$, $22_L$ jointly press the body portion 11 rearward. That is, a load is applied evenly on the front surface of the body portion 11. Therefore, the body portion 11 is deformed so as to be compressed from the front end side to the rear end side. As described earlier, the recessed portions RP are formed in the right wall portion 114 and the left wall portion 113 of the body portion 11, and each of the recessed portions RP serves as a joint (a starting point) allowing the body portion 11 to be deformed further. In the process of the deformation of the body portion 11, the bumper reinforcement 20 is hardly deformed.

Figure 17:
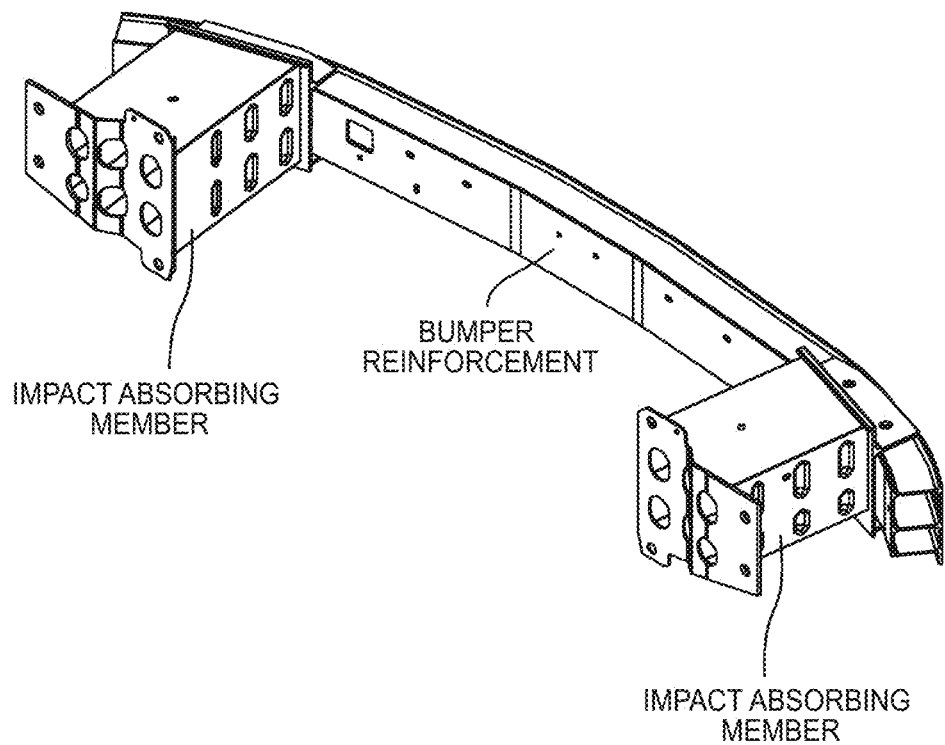
FIG. 17 is a perspective view of a bumper reinforcement and an impact absorbing member according to another related art seen diagonally from the rear right side.
Figure 18:
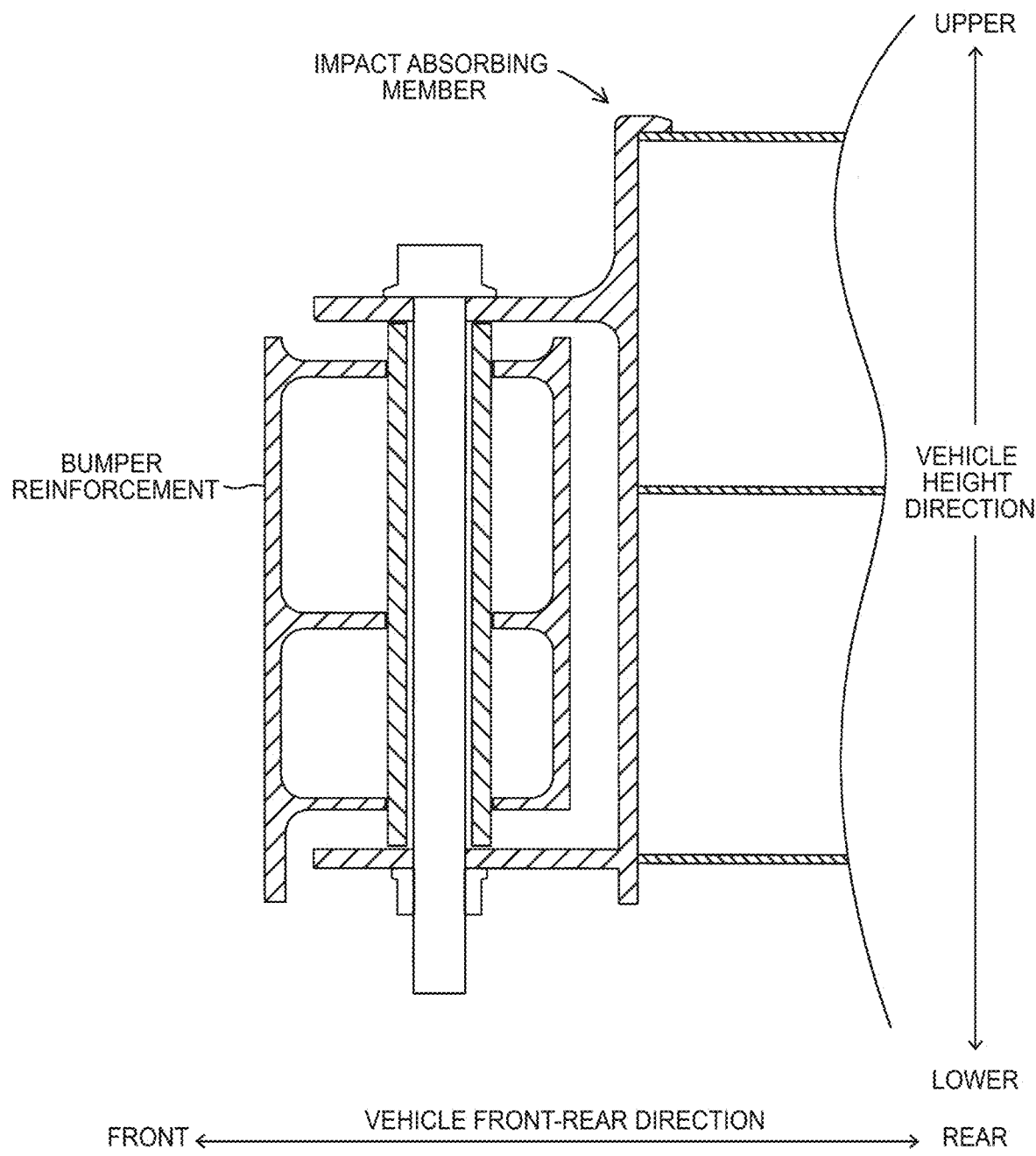
FIG. 18 is a sectional view of a portion where the bumper reinforcement and the impact absorbing member are fastened to each other in a vehicle to which the impact absorbing member shown in FIG. 17 is applied.
Figure 19A:
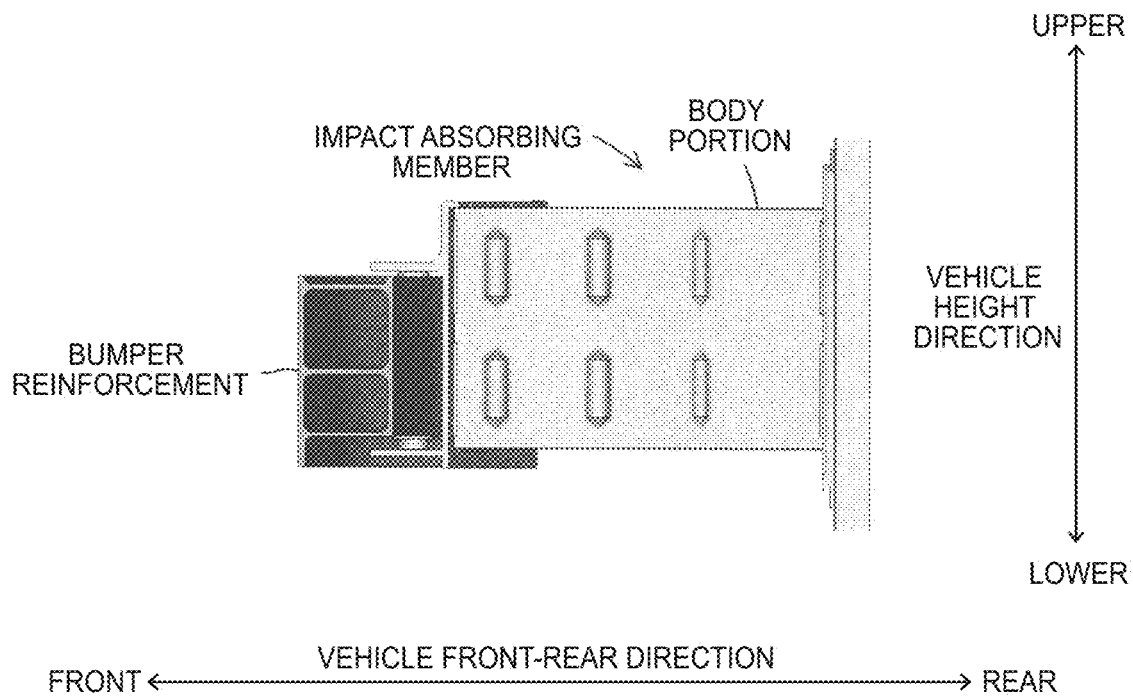
FIG. 19A is a side view showing a state before an object collides with a vehicle to which the bumper reinforcement and the impact absorbing member shown in FIG. 17 are applied.
Figure 19B:
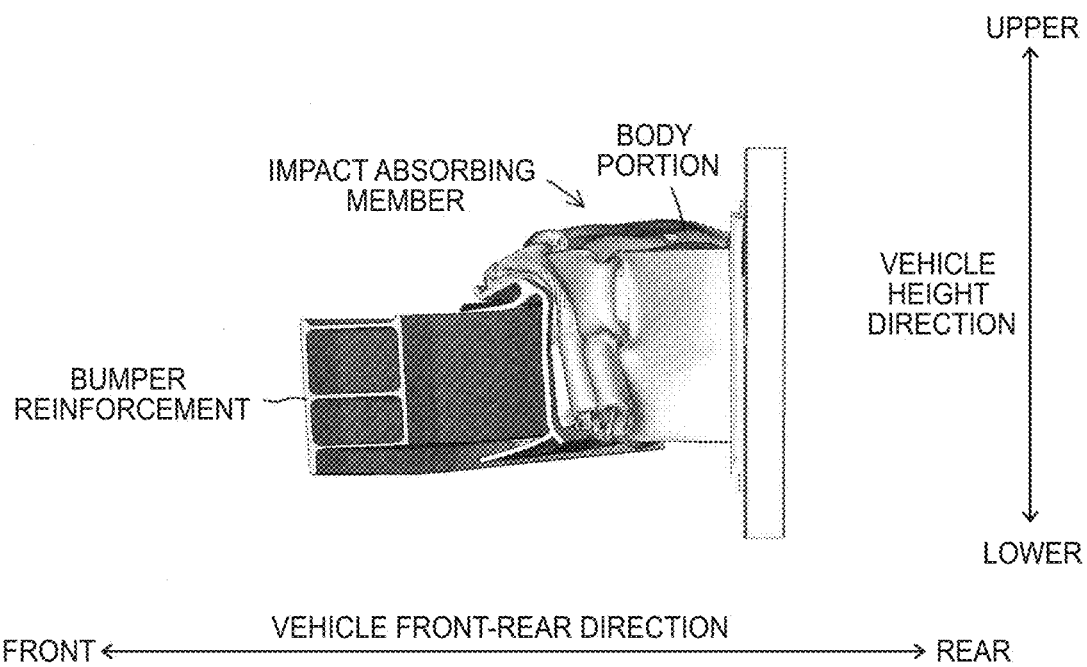
FIG. 19B is a side view showing a state after the object collides with the vehicle to which the bumper reinforcement and the impact absorbing member shown in FIG. 17 are applied.

Thus, in the impact absorbing device 1, a distal end portion of the body portion 21 is restrained from being bent downwardly unlike the related art shown in FIG. 19A and FIG. 19B. Then, the body portion 11 is deformed so as to be compressed in an axis direction thereof. In other words, almost no part of the body portion 11 remains undestroyed (i.e., almost the entire body portion 11 is destroyed (collapsed)). Therefore, impact absorbing performance of the impact absorbing device 1 is higher than that of the impact absorbing device shown in FIG. 17 and FIG. 18. Therefore, impact absorbing performance of the impact absorbing device 1 is not deteriorated even when the length $H_{21}$ of the body portion 21 in the vehicle height direction is set to be smaller than the length $H_{11}$ of the body portion 11 in the vehicle height direction in order to maintain maximum cooling performance of the radiator RD.

Figure 16:
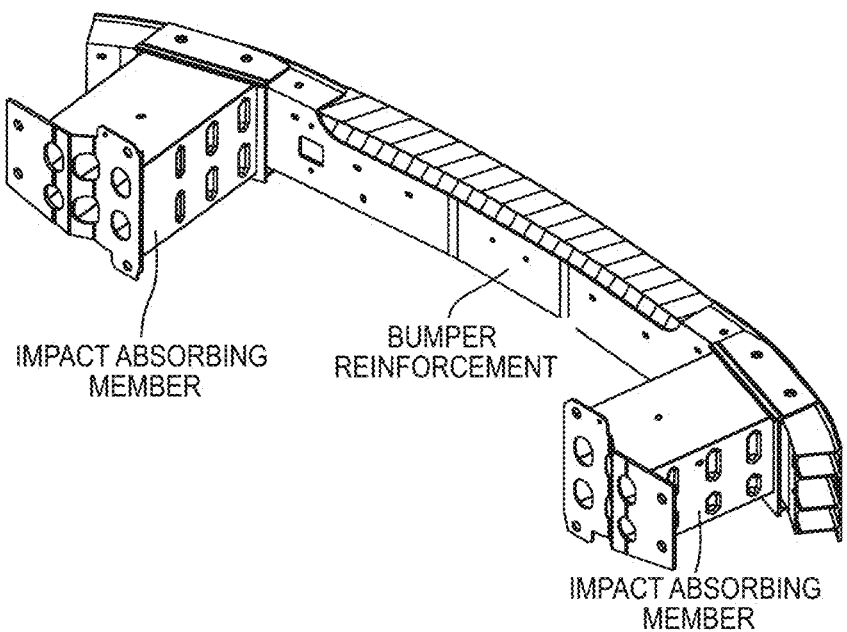
FIG. 16 is a perspective view of a bumper reinforcement and an impact absorbing member according to a related art seen diagonally from a rear right side.

It is considered that, like the example shown in FIG. 16, a length of the intermediate extruded body of the bumper reinforcement in the vehicle height direction may be set to be equal to a length of the impact absorbing member in the vehicle height direction, and a portion in front of the radiator RD (the hatched portion in FIG. 16) may be trimmed. However, in this case, a material of the trimmed portion is a waste (i.e., a material of the trimmed portion is useless). In comparison with the bumper reinforcement shown in FIG.

16, the portion to be trimmed is smaller in the production of the bumper reinforcement 20. Thus, the production cost of the bumper reinforcement 20 is lower than that of the bumper reinforcement shown in FIG. 16.

Moreover, the disclosure is not limited to the embodiment, and various modifications may be made without departing from the scope of the disclosure.

For example, in the embodiment, the body portion 21 is attached to the upper sides of the front end surfaces of the impact absorbing members $10_R$, $10_L$. Alternatively, the body portion 21 may be attached to lower sides of the front end surfaces of the impact absorbing members $10_R$, $10_L$. In this case, the reinforcing portions $22_R$, $22_L$ may be attached to the upper surface of the body portion 21. The body portion 21 may be attached to intermediate portions of the front end surfaces of the impact absorbing members $10_R$, $10_L$. In this case, the reinforcing portion $22_R$ may be attached to each of the upper surface and the lower surface of the body portion 21, and the reinforcing portion $22_L$ may be attached to each of the upper surface and the lower surface of the body portion 21. Thus, the reinforcing portions $22_R$, $22_L$ may be provided along (in front of) portions of the front end surfaces of the body portions 11, the portions being positioned above the upper surface of the body portion 21 and below the lower surface of the body portion 21. Further, at least a part of each of the reinforcing portions $22_R$, $22_L$ may be disposed in front of a meeting portion at which two adjacent wall portions among the wall portions of the body portion 11 meet each other. In other words, at least a part of each of the reinforcing portions $22_R$, $22_L$ may overlap the meeting portion at which two adjacent wall portions among the wall portions of the body portion 11 meet each other when viewed from ahead of the bumper reinforcement 20 (i.e., in a front view of the impact absorbing device 1).

The front surface of the left end portion 21L (21R) of the body portion 21 and the front surface of the reinforcing portion $22_L$ ($22_R$) are flush with each other. Further, the rear surface of the left end portion 21L (21R) of the body portion 21 and the rear surface of the reinforcing portion $22_L$ ($22_R$) are flush with each other. However, the front surface of the left end portion 21L (21R) and the front surface of the reinforcing portion $22_L$ ($22_R$) may be offset from each other in the vehicle front-rear direction to some extent. The rear surface of the left end portion 21L (21R) of the body portion 21 and the rear surface of the reinforcing portion $22_L$ ($22_R$) may be offset from each other in the vehicle front-rear direction to some extent.

In the disclosure, the length of the body portion of the bumper reinforcement in the vehicle height direction is smaller than the length of the impact absorbing member in the vehicle height direction. Therefore, in a state where the body portion of the bumper reinforcement is fixed to the front end surface of the impact absorbing member, an upper end portion or a lower end portion of the impact absorbing member is positioned above or below the body portion, or the upper end portion and the lower end portion of the impact absorbing member are respectively positioned above and below the body portion. The reinforcing portion is positioned in front of the portion of the impact absorbing member, the portion being positioned above or below the body portion. Thus, the reinforcing portion extends along the portion of the front end surface of the impact absorbing member, the portion being positioned above or below the body portion. In other words, when viewed from ahead of the bumper reinforcement (in a front view of the impact absorbing device), the front surface (the rear surface) of the reinforcing portion overlaps the portion of the front end surface of the impact absorbing member, the portion being positioned above or below the body portion (refer to FIG. 15). Further, the reinforcing portion is fixed to the body portion.

Therefore, when an object collides with the vehicle from the front side, a rearward load is applied to the front surface of the bumper reinforcement. In that case, the body portion and the reinforcing portion jointly press the impact absorbing member rearward. That is, a load is applied evenly to the front surface of the impact absorbing member. Therefore, the impact absorbing member is deformed so as to be compressed towards the rear end side from the front end side.

Thus, in the impact absorbing device (or the bumper reinforcement) according to the disclosure, a distal end portion of the impact absorbing member is restrained from being bent downward unlike a related art shown in FIG. 19A and FIG. 19B. Then, the impact absorbing member is deformed so as to be compressed in the axis direction of the impact absorbing member. In other words, almost no part of the impact absorbing member remains undestroyed (i.e., almost the entire impact absorbing member is destroyed (collapsed)). Therefore, impact absorbing performance of the impact absorbing device according to the disclosure is higher than that of an impact absorbing device according to the related art shown in FIG. 17 and FIG. 18. That is, impact absorbing performance of the impact absorbing device is not deteriorated even when a length of the body portion in the vehicle height direction is set to be smaller than the length of the impact absorbing member in the vehicle height direction in order to maintain maximum cooling performance of a radiator.

Also, it is considered that, like the example shown in FIG. 16, a length of an intermediate extruded body of the bumper reinforcement in the vehicle height direction may be set to be equal to a length of the impact absorbing member in the vehicle height direction, and a portion in front of the radiator (a hatched portion in FIG. 16) may be trimmed. However, in this case, a material of the trimmed portion is a waste (i.e., a material of the trimmed portion is useless). In comparison with the bumper reinforcement shown in FIG. 16, a portion to be trimmed is smaller in the production of the bumper reinforcement according to the disclosure. Therefore, manufacturing cost of the bumper reinforcement according to the disclosure is lower than that of the bumper reinforcement shown in FIG. 16.

What is claimed is:
1. An impact absorbing device comprising:
   an impact absorbing member extending in a vehicle front-rear direction; and
   a bumper reinforcement that extends in a vehicle width direction and is attached to a front end surface of the impact absorbing member, wherein
   the bumper reinforcement includes
      a body portion extending in the vehicle width direction and having a length in a vehicle height direction that is smaller than a length of the impact absorbing member in the vehicle height direction, and
      a reinforcing portion fixed to the body portion and extending along a portion of the front end surface of the impact absorbing member, the reinforcing portion being positioned above or below the body portion.
2. The impact absorbing device according to claim 1, wherein a front surface of the body portion and a front surface of the reinforcing portion are flush with each other.

3. The impact absorbing device according to claim 1, wherein a rear surface of the body portion and a rear surface of the reinforcing portion are flush with each other.

4. The impact absorbing device according to claim 1, wherein:
   the impact absorbing member includes a plurality of wall portions extending in the vehicle front-rear direction; and
   at least a part of the reinforcing portion overlaps a meeting portion at which two adjacent wall portions among the plurality of wall portions of the impact absorbing member meet each other when viewed from ahead of the bumper reinforcement.

5. A bumper reinforcement configured to be attachable to a front end surface of an impact absorbing member extending in a vehicle front-rear direction, the bumper reinforcement comprising:
   a body portion extending in a vehicle width direction and having a length in a vehicle height direction that is smaller than a length of the impact absorbing member in the vehicle height direction; and
   a reinforcing portion fixed to the body portion and extending along a portion of the front end surface of the impact absorbing member, the reinforcing portion being positioned above or below the body portion.

6. The bumper reinforcement according to claim 5, wherein a front surface of the body portion and a front surface of the reinforcing portion are flush with each other.

7. The bumper reinforcement according to claim 5, wherein a rear surface of the body portion and a rear surface of the reinforcing portion are flush with each other.

8. The bumper reinforcement according to claim 5, wherein:
   the impact absorbing member includes a plurality of wall portions extending in the vehicle front-rear direction; and
   the reinforcement portion is configured to be attachable to the front end surface of the impact absorbing member such that at least a part of the reinforcing portion overlaps a meeting portion at which two adjacent wall portions among the plurality of wall portions of the impact absorbing member meet each other when viewed from ahead of the bumper reinforcement.

* * * * *